(12) United States Patent
Shi et al.

(10) Patent No.: US 11,514,260 B2
(45) Date of Patent: Nov. 29, 2022

(54) INFORMATION RECOMMENDATION METHOD, COMPUTER DEVICE, AND STORAGE MEDIUM

(71) Applicant: TENCENT TECHNOLOGY (SHENZHEN) COMPANY LIMITED, Shenzhen (CN)

(72) Inventors: Zhiling Shi, Shenzhen (CN); Li Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 644 days.

(21) Appl. No.: 16/592,085

(22) Filed: Oct. 3, 2019

(65) Prior Publication Data

US 2020/0034656 A1 Jan. 30, 2020

Related U.S. Application Data

(63) Continuation of application No. PCT/CN2018/100235, filed on Aug. 13, 2018.

(30) Foreign Application Priority Data

Sep. 8, 2017 (CN) .......................... 201710806375.0

(51) Int. Cl.
*G06K 9/00* (2022.01)
*G06K 9/62* (2022.01)
(Continued)

(52) U.S. Cl.
CPC ........... *G06K 9/6215* (2013.01); *G06K 9/623* (2013.01); *G06K 9/6257* (2013.01); *G06N 5/04* (2013.01);
(Continued)

(58) Field of Classification Search
CPC .... G06K 9/6215; G06K 9/623; G06K 9/6257; G06N 5/04; G06V 10/40; G06V 10/761;
(Continued)

(56) References Cited

U.S. PATENT DOCUMENTS

| 8,831,358 B1 * | 9/2014 | Song .................... G06K 9/6267 |
| | | 382/218 |
| 9,256,807 B1 * | 2/2016 | Shlens .................. G06F 16/583 |

(Continued)

FOREIGN PATENT DOCUMENTS

| CN | 105354307 A | * | 2/2016 | ......... G06F 16/5838 |
| CN | 105955994 | | 9/2016 | |

(Continued)

OTHER PUBLICATIONS

General patterns of tag usage among university groups in Flickr, Emma Angus et al., 2008, pp. 89-101 (Year: 2008).*

(Continued)

*Primary Examiner* — Jayesh A Patel
(74) *Attorney, Agent, or Firm* — ArentFox Schiff LLP

(57) ABSTRACT

Information recommendation methods are provided. Image information corresponding to an image is obtained by processing circuitry. The image is associated with a user identifier. A user tag set corresponding to the user identifier and the image information is generated. A feature vector corresponding to user tags in the user tag set and the image information is formed. The feature vector is processed according to a trained information recommendation model, to obtain a recommendation parameter of to-be-recommended information. A recommendation of the to-be-recommended information is provided to a terminal corresponding to the user identifier according to the recommendation parameter.

20 Claims, 15 Drawing Sheets

(51) Int. Cl.
 *G06N 5/04* (2006.01)
 *G06V 10/778* (2022.01)
 *G06V 20/30* (2022.01)
 *G06V 20/00* (2022.01)
(52) U.S. Cl.
 CPC ............ *G06V 10/778* (2022.01); *G06V 20/30* (2022.01); *G06V 20/35* (2022.01)
(58) Field of Classification Search
 CPC ...... G06V 10/74; G06V 10/762; G06V 10/70; G06V 10/764
 See application file for complete search history.

(56) References Cited

U.S. PATENT DOCUMENTS

| | | | | |
|---|---|---|---|---|
| 10,140,315 | B1* | 11/2018 | Hohwald | G06F 16/24578 |
| 2015/0254532 | A1* | 9/2015 | Talathi | G06V 30/194 |
| | | | | 382/156 |
| 2016/0267359 | A1* | 9/2016 | Gan | G06N 3/088 |
| 2017/0330054 | A1* | 11/2017 | Fu | G06N 3/0454 |
| 2019/0156122 | A1* | 5/2019 | Lu | G06V 10/764 |

FOREIGN PATENT DOCUMENTS

| | | | | | |
|---|---|---|---|---|---|
| CN | 105975641 | | 9/2016 | | |
| CN | 106250532 | | 12/2016 | | |
| CN | 106250532 | A * | 12/2016 | ............ | G06F 16/00 |
| CN | 107016567 | | 8/2017 | | |
| CN | 107016567 | A * | 8/2017 | | |
| CN | 108304435 | | 7/2018 | | |
| KR | 2012087214 | A * | 8/2012 | | |
| KR | 20120087214 | | 8/2012 | | |
| WO | WO-2017075939 | A1 * | 5/2017 | ......... | G06F 16/5838 |
| WO | WO-2019075123 | A1 * | 4/2019 | ............ | G06F 16/51 |

OTHER PUBLICATIONS

International Search Report dated Nov. 15, 2018 in PCT/CN2018/100235 filed Aug. 13, 2018. (With English Translation).
Written Opinion dated Nov. 15, 2018 in PCT/CN2018/100235 filed Aug. 13, 2018.

* cited by examiner

INFORMATION RECOMMENDATION METHOD, COMPUTER DEVICE, AND STORAGE MEDIUM

RELATED APPLICATION

This application is a continuation of International Application No. PCT/CN2018/100235, filed on Aug. 13, 2018, which claims priority to Chinese Patent Application No. 201710806375.0, filed on Sep. 8, 2017, and entitled "INFORMATION RECOMMENDATION METHOD AND APPARATUS, COMPUTER DEVICE, AND STORAGE MEDIUM". The prior applications are hereby incorporated by reference in their entirety.

FIELD OF THE TECHNOLOGY

This application relates to the field of computer processing, and in particular, to an information recommendation method, a computer device, and a storage medium.

BACKGROUND OF THE DISCLOSURE

With the development of the Internet, lives of people are increasingly closely linked with the Internet. In this fast-paced era, users expect to find required products through the Internet quickly. However, massive product data is constantly generated on the Internet every day. This makes it difficult for an Internet user to quickly find required information or information of interest. To help users obtain information and content conveniently, related information is recommended to the users in many fields. However, in a conventional recommendation mode, the same information is usually recommended to all users. his information recommendation mode is not accurate enough, and easily disturbs other users.

SUMMARY

According to embodiments of this application, information recommendation methods, information processing apparatuses, and non-transitory computer-readable storage mediums are provided.

In an embodiment, an information recommendation method is provided. Image information corresponding to an image is obtained. The image is associated with a user identifier. A user tag set corresponding to the user identifier and the image information is generated. A feature vector corresponding to user tags in the user tag set and the image information is formed. The feature vector is processed according to a trained information recommendation model, to obtain a recommendation parameter of to-be-recommended information. A recommendation of the to-be-recommended information is provided to a terminal corresponding to the user identifier according to the recommendation parameter.

In an embodiment, the image information includes image content information and image acquisition information. The image content information includes a plurality of images. The images are classified according to the image content information, and a first user tag set corresponding to the image content information is determined based on a result of the classification according to the image content information. The images are classified according to the image acquisition information, and a second user tag set corresponding to the image acquisition information is determined based on a result of the classification according to the image acquisition information.

In an embodiment, matching with standard user models is performed according to the user tags in the user tag set and the image information corresponding to the user tags in a case that a scale of the user tag set corresponding to the user identifier is less than a preset scale. A target standard user model of the standard user models matching the user identifier is determined. A standard user feature vector corresponding to the target standard user model is obtained as the feature vector corresponding to the user identifier.

In an embodiment, degrees of matching between a user corresponding to the user identifier and the standard user models are calculated according to the user tags in the user tag set and the image information corresponding to the user tags. A standard user model of the standard user models with a highest degree of matching of the calculated degrees of matching is selected as the target standard user model matching the user identifier.

In an embodiment, image quantities corresponding to the user tags in the user tag set are obtained. Current scores corresponding to the user tags are determined according to the image quantities. For each of the standard user models, standard scores corresponding to standard user tags that are in the respective standard user model and that are the same as the user tags are obtained; degrees of similarity between the user tags in the user tag set and the standard user tags are calculated according to the standard scores and the corresponding current scores; and the degree of matching between the user corresponding to the user identifier and the respective standard user model is obtained according to the degrees of similarity.

In an embodiment, training image information is obtained. A training user tag set is generated according to the training image information. A training feature vector is formed according to training user tags in the training user tag set and the training image information corresponding to the training user tag set. A standard output result corresponding to the training feature vector is obtained. Model training is performed by using the training feature vector and the standard output result as a training sample, to obtain a target information recommendation model.

In an embodiment, a primary user tag set corresponding to the user identifier and the image information is determined. A secondary user tag set is generated based on extracted features of the primary user tag set. The user tag set corresponding to the user identifier is formed according to the primary user tag set and the secondary user tag set.

In an embodiment, each piece of the to-be-recommended information has a corresponding information recommendation model. The feature vector is processed according to the corresponding information recommendation models, to obtain a corresponding recommendation parameter set. Each recommendation parameter in the recommendation parameter set is used for determining a recommendation probability of one piece of the to-be-recommended information. An information recommendation list corresponding to the user identifier is generated according to the recommendation probabilities corresponding to the pieces of the to-be-recommended information. Target to-be-recommended information corresponding to the user identifier is determined according to the information recommendation list.

In an embodiment, the to-be-recommended information is provided to the terminal corresponding to the user identifier in a form of a picture when the recommendation parameter is greater than a preset threshold.

In an embodiment, there is provided an information recommendation method, in which image information corresponding to an image is obtained. The image is associated with a user identifier. A current user tag set corresponding to the user identifier and the image information is generated. To-be-recommended information and an expected user tag set corresponding to the to-be-recommended information are obtained. A degree of similarity between the current user tag set and the expected user tag set is calculated. A recommendation of the to-be-recommended information is provided to a terminal corresponding to the user identifier according to the degree of similarity.

In an embodiment, a primary user tag set corresponding to the user identifier and the image information is generated. A secondary user tag set is generated based on extracted features of the primary user tag set. The current user tag set is generated based on the primary user tag set and the secondary user tag set. Further, the degree of similarity is calculated between the secondary user tag set and the expected user tag set.

In an embodiment, image quantities corresponding to current user tags in the current user tag set are obtained. Current scores corresponding to the current user tags are determined according to the image quantities. An expected score corresponding to each user tag in the expected user tag set is obtained. The degree of similarity between the current user tag set and the expected user tag set is calculated according to the current scores and the expected scores.

Embodiments of the present disclosure further includes information processing apparatuses configured to, and non-transitory computer-readable mediums storing instructions which when executed by one or more processors cause the one or more processors to, perform one or a combination of the above methods.

Details of one or more embodiments of this application are proposed in the following accompanying drawings and description. Other features, objectives and advantages of this application will become more evident from the specification, the accompanying drawings, and the claims.

BRIEF DESCRIPTION OF THE DRAWINGS

To describe the technical solutions in the embodiments of this application more clearly, the following briefly introduces the accompanying drawings required for describing the embodiments. While the accompanying drawings in the following description show some embodiments of this application, a person of ordinary skill in the art may still derive other drawings from these accompanying drawings.

DESCRIPTION OF EMBODIMENTS

To make the objectives, technical solutions and advantages of this application more comprehensible, the following describes this application in further detail with reference to the accompanying drawings and embodiments. It is to be understood that the embodiments described herein are merely for the illustration of this application, and are not intended to limit this application.

Figure 1:
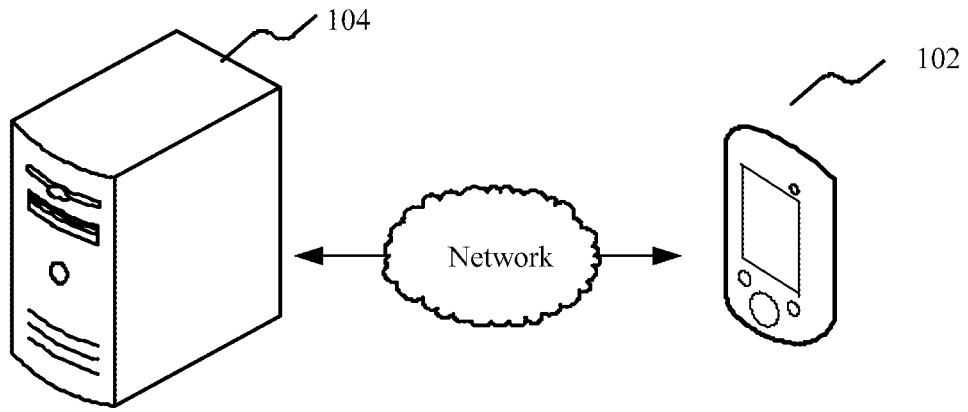
FIG. 1 is a diagram of an application environment of an information recommendation method in an embodiment.

As shown in FIG. 1, in an embodiment, an information recommendation method may be applied in an application environment shown in FIG. 1. In the application environment, a terminal 102 is connected to a server 104 through a network. The terminal 102 may be a smartphone, a tablet computer, a notebook computer, a desktop computer, and the like, but is not limited thereto. The server 104 may be an independent server, or may be a server cluster formed by multiple servers. The server 104 first obtains image information from the terminal 102, the image information having a corresponding user identifier, generates a user tag set corresponding to the user identifier according to the image information, forms a feature vector corresponding to the user identifier according to user tags in the user tag set and the corresponding image information, inputs the feature vector into a trained information recommendation model, outputs a recommendation parameter of to-be-recommended information, and recommends the to-be-recommended information to the terminal 102 corresponding to the user identifier according to the recommendation parameter.

Figure 2:
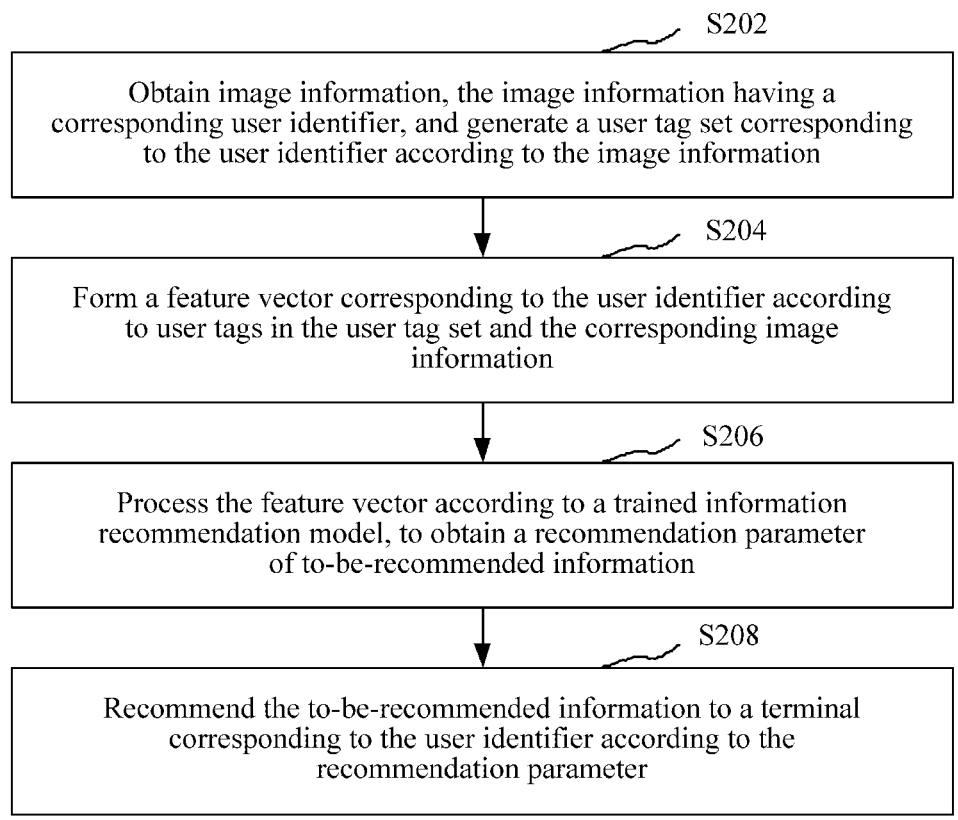
FIG. 2 is a flowchart of an information recommendation method in an embodiment.

As shown in FIG. 2, in an embodiment, an information recommendation method is proposed. The method applied to a server is used as an example in the following. The method specifically includes the following steps:

In step S202, Image information is obtained. The image information has a corresponding user identifier. Further, a user tag set corresponding to the user identifier is generated according to the image information.

The image information includes at least one of image content information, image acquisition information, and image quantity information. The image may be a picture or a video. The video may be considered as consisting of, or including, frames of pictures. The obtained image information corresponds to a user identifier. The user identifier is used for uniquely identifying a user. The user identifier may be an account registered by the user, a terminal identifier, a unique number allocated to the user, or the like. The user tag set includes multiple user tags, and the user tags represent features of the user. The user tag may be one or more of an age, a gender, a hobby, a financial capability, and a schedule of the user. In an embodiment, the image information may be information obtained by a terminal by recognizing an image. For example, the terminal first recognizes image content by using an image recognition technology, and then uploads the recognized image content to the server. The server obtains image information, and performs classification according to the obtained image information. For example, the server uniformly classifies a recognized mountain, sea, snowfield, sky, and the like into a scenery class, and uniformly classifies images including two or more characters into a group photo class. Then, a user tag set corresponding to the user identifier is generated according to a classification result. For example, user tags include scenery, group photo, selfie, food, and the like. In another embodiment, the image information may be an image itself. The terminal directly uploads images in the terminal to the server. Then, the server recognizes the images by using a photo recognition technology, performs classification according to a recognition result, and then generates a user tag set corresponding to the user identifier according to a classification result.

In step S204, a feature vector corresponding to the user identifier is formed according to user tags in the user tag set and the corresponding image information.

Each user tag in the user tag set represents one user feature. The server determines a feature value corresponding to each user tag according to each user tag and the corresponding image information, and forms a feature vector corresponding to the user identifier according to the feature values corresponding to the user tags. The feature vector refers to a vector that can comprehensively reflect features of the user. For example, it is assumed that the user tags in the user tag set includes 6 user tags, for example, food, scenery, group photo, selfie, animal, and building. A picture quantity corresponding to each user tag is used as a corresponding feature value. For example, there are 5 food pictures, 10 scenery pictures, 20 group photos, 15 selfies, 3 animal pictures, and 18 building pictures. An arrangement order of the user tags is set in advance. For example, the arrangement order is: food, scenery, group photo, selfie, animal, and building. Then, the corresponding feature vector may be represented as (5, 10, 20, 15, 3, 18).

In step S206, the feature vector is processed according to a trained information recommendation model, to obtain a recommendation parameter of to-be-recommended information.

The information recommendation model is used for predicting whether a user is interested in the to-be-recommended information, and outputting a recommendation parameter corresponding to the to-be-recommended information. The recommendation parameter reflects interest of the user in the to-be-recommended information. The to-be-recommended information refers to target information needing to be pushed to the user. In an embodiment, the recommendation parameter is an output result of whether to recommend the to-be-recommended information or not, that is, the recommendation parameter is "recommending" or "not recommending". Subsequently, the server can directly determine, according to the recommendation result, whether to recommend the to-be-recommended information. In another embodiment, the recommendation parameter is a recommendation probability or non-recommendation probability obtained through calculation, that is, a probability that the user is interested in the to-be-recommended information is obtained. Subsequently, it is determined, according to the recommendation probability, whether to recommend the to-be-recommended information. The information recommendation model may be stored in the server performing the information recommendation method, or may be stored in another server. When the recommendation parameter needs to be obtained, the information recommendation model stored in the other server is invoked to process the feature vector, to obtain the recommendation parameter of the to-be-recommended information.

In step S208, the to-be-recommended information is recommended to a terminal corresponding to the user identifier according to the recommendation parameter.

The recommendation parameter reflects interest of the user in the to-be-recommended information. If the recommendation parameter is a recommendation probability, a recommendation threshold is preset. If the recommendation parameter is greater than the preset recommendation threshold, it indicates that the user is interested in the to-be-recommended information, and the server pushes the to-be-recommended information to the terminal corresponding to the user identifier. If the recommendation parameter is a "recommending" or "not recommending" result, it is directly determined, according to the "recommending" or "not recommending" result, whether to push the to-be-recommended information to the terminal corresponding to the user identifier. That is, if the recommendation parameter is "recommending", the to-be-recommended information is pushed to the terminal corresponding to the user identifier; if the recommendation parameter is "not recommending", the to-be-recommended information is not pushed to the terminal corresponding to the user identifier.

In the foregoing information recommendation method, image information is obtained; a user tag set corresponding to a user identifier is generated according to the image information; then, a feature vector corresponding to the user identifier is formed according to user tags in the user tag set and the corresponding image information; the feature vector is input to a trained information recommendation model, and a recommendation parameter of to-be-recommended information is output; and the to-be-recommended information is recommended to a terminal corresponding to the user identifier according to the recommendation parameter. According to the information recommendation method, a user tag set capable of reflecting features of a user can be established by using image information, and a recommendation parameter of the user for recommended information is predicted according to the user tag set by using a trained information recommendation model. Then, the information is recommended according to the recommendation parameter, thereby not only improving the accuracy of recommendation but also avoiding disturbing users not interested in the information.

Figure 3:
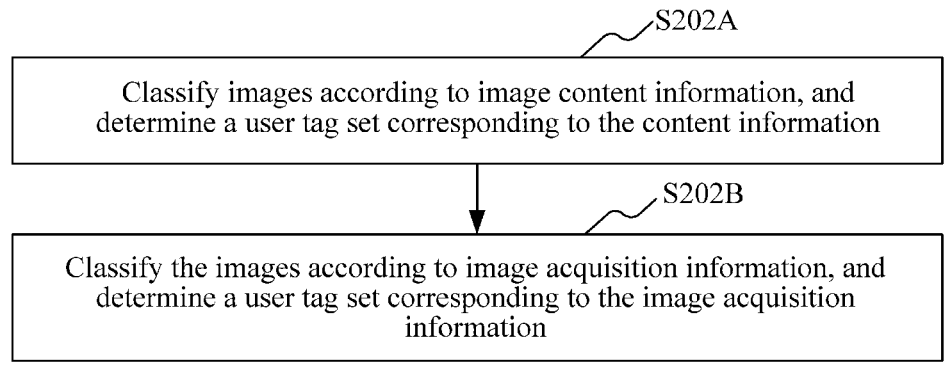
FIG. 3 is a flowchart of a method for generating a user tag set corresponding to a user identifier according to image information in an embodiment.

As shown in FIG. 3, in an embodiment, the image information includes image content information and image acquisition information; the step of generating a user tag set corresponding to the user identifier according to the image information includes the following steps:

In step S202A, images are classified according to the image content information, and a user tag set corresponding to the content information is determined.

Figure 4A:
FIG. 4A is a schematic diagram of an interface of a content-based classification result in an embodiment.

The image information includes image content information and image acquisition information. The image content information refers to content information included in an image. Images are classified according to content information included in the images. For example, pictures may be classified as scenery, food, baby, group photo, selfie, and the like according to the content information. In an embodiment, the pictures with image content information of scenery, such as a mountain, a sea, a snowfield, a sky, and forests, are uniformly classified into a scenery class; pictures containing small babies are uniformly classified into a baby class; selfie pictures obtained through a terminal are uniformly classified into a selfie class; and the like. FIG. 4A is a schematic diagram of an interface of a content-based classification result in an embodiment. Then, a user tag corresponding to each class of content information is determined according to a classification result, for forming a user tag set based on content classes. For example, it is assumed that classification is performed according to content of image information, and an obtained classification result includes scenery, group photo, food, and selfie. In this case, the scenery, group photo, food, and selfie are used as corresponding user tags respectively. In other words, a user tag set obtained after classification based on recognized content is used as the user tag set corresponding to the content information.

In step S202B, the images are classified according to the image acquisition information, and a user tag set corresponding to the image acquisition information is determined.

Figure 4B:
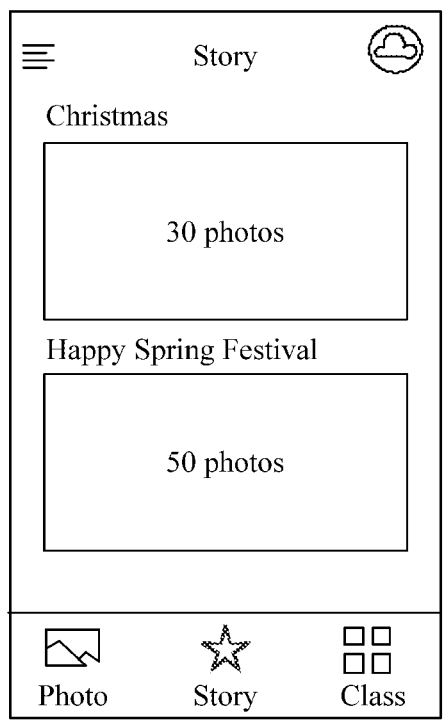
FIG. 4B is a schematic diagram of an interface of a holiday-based classification result in an embodiment.

The image acquisition information includes at least one of acquisition time information, acquisition location information, and the like. The server may classify images according to acquisition time only, or classify images according to acquisition locations only, or classify images according to both the acquisition time and the acquisition locations. In an embodiment, images are classified according to acquisition locations (photographing locations). First, acquisition location information corresponding to each image is obtained, to obtain a city where each image is taken. Then, the number of times or frequency of appearance of each city is counted, and a city with a highest number of times or frequency is used as a place of residence of the user. Places other than the place of residence are used as travel destinations. Images taken at the same location may be classified into one class. In this way, a city where the user is located can be obtained, and the number of travelling times can be counted, including the number of times of domestic travel and the number of times of overseas travel. All these can be used as user tags. In another embodiment, images are classified according to acquisition time. For example, if photos are taken on holiday or a specific festival, the photos may be classified into a Spring Festival album, a National Day album, and the like. FIG. 4B is a schematic diagram of an interface of a holiday-based classification result in an embodiment. A holiday album may also be a tag of the user, reflecting a daily life state and a photographing preference of the user. For example, if the user takes all photos during holidays, it indicates that the user is a typical office worker. A user tag set obtained by classifying images according to the image acquisition information is used as the user tag set corresponding to the image information. In another embodiment, the image acquisition information may further include acquisition device information, and the corresponding acquisition device information is also used as a user tag. For example, if an acquisition device is IPhone7, the IPhone7 is also used as a user tag.

Figure 5:
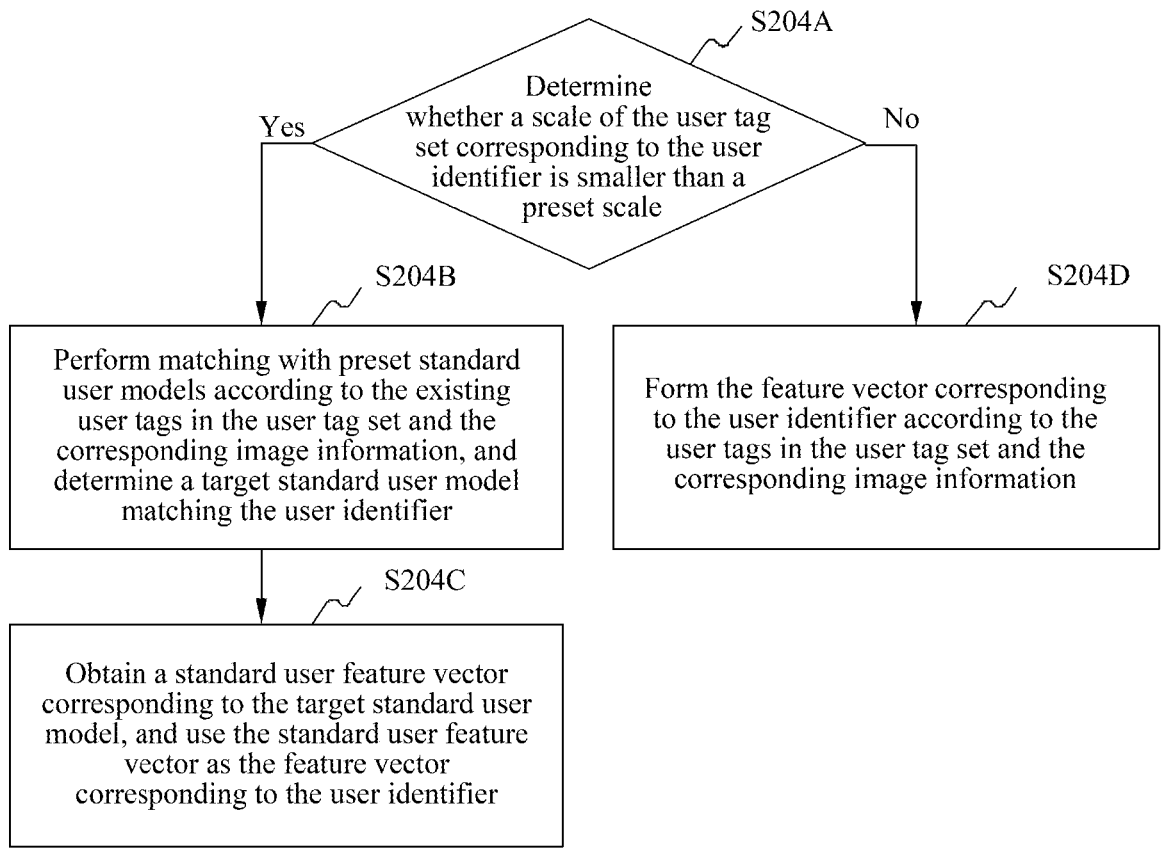
FIG. 5 is a flowchart of a method for forming a feature vector corresponding to a user identifier according to user tags in a user tag set and corresponding image information in an embodiment.

As shown in FIG. 5, in an embodiment, step S204 of forming a feature vector corresponding to the user identifier according to user tags in the user tag set and the corresponding image information includes the following steps:

In step S204A, a determination is made as to whether a scale of the user tag set corresponding to the user identifier is less than a preset scale; if yes, step S204B is performed; otherwise, 5204D is performed directly.

The scale of the user tag set is used for measuring the integrity of user tags, including at least one of the quantity of user tags, and a total quantity of images corresponding to the user tag set. User tag sets corresponding to some user identifiers have relatively small scales. For example, some users just changed their phones, and therefore only a few photos are stored in the phones. In this case, few user tags can be obtained merely according to the existing images, and a prediction result obtained from a small quantity of user tags is easily distorted. Therefore, it is necessary to establish an auxiliary tag system for the users with incomplete tag information, to make tags of the users complete. First, a preset scale of a user tag set is configured in advance. The preset scale may be a preset user tag quantity. For example, a preset user tag quantity of 10 is used as the preset scale. The preset scale may also be a preset total image quantity. For example, a preset image quantity of 50 is used as the preset scale. The preset scale may include both the preset user tag quantity and the total image quantity. That is, the preset scale includes the preset user tag quantity and the total image quantity, and the preset scale is achieved only when the two conditions are met at the same time. Specifically, it is first determined, according to the scale of the user tag set corresponding to the user identifier, whether the preset scale is achieved; if the preset scale is achieved, it indicates that the user tag set corresponding to the user identifier is relatively complete, and the feature vector corresponding to the user identifier can be directly formed according to user tags in the existing user tag set and the corresponding image information. If the preset scale is not achieved, it indicates that the user tag set corresponding to the user identifier needs to be further improved.

In step S204B, matching with preset standard user models is performed according to the existing user tags in the user tag set and the corresponding image information, and a target standard user model matching the user identifier is determined.

The standard user model refers to a preset user model that can represent features of a group, for example, a standard young mother model representing the group of young moms. Users with the same or similar features are classified into the same group, and a standard user model that can represent features of the group is set. The standard user model is described through a user tag set that can reflect features of the corresponding group. Specifically, multiple standard user models are set in advance. For example, a standard young mother model, a standard young boy model, and a standard anime-and-manga girl model are set. When the scale of the user tag set corresponding to the user identifier is less than the preset scale, the server obtains existing user tags in the user tag set, performs matching with user tag sets corresponding to the corresponding standard user models according to the existing user tags, and uses a standard user model having a highest degree of matching with the user identifier as the matched target standard user model. In an embodiment, a degree of matching may be calculated according to the quantity of identical user tags. For example, a user identifier of a to-be-improved user tag set corresponds to 6 existing user tags; it is assumed that there are 3 standard user models, which are A, B, and C respectively. It is assumed that among user tags corresponding to the model A, there are 4 user tags that are the same as the existing user tags; then, a corresponding degree of matching is 4; there are 3 existing user tags that are the same as user tags of the model B, and a corresponding degree of matching is 3; there are 5 existing user tags that are the same as user tags of the model C, and a corresponding degree of matching is 5. In this case, because the model C has the largest quantity of user tags that are the same as those of the user, the model C is used as the matched target standard user model.

In step S204C, a standard user feature vector corresponding to the target standard user model is obtained, and the standard user feature vector is used as the feature vector corresponding to the user identifier.

The standard user feature vector refers to a feature vector corresponding to the standard user model, and is determined according to the user tag set corresponding to the standard user model and the corresponding image information. Each user tag in the user tag set represents one user feature. According to image information corresponding to each user tag, a feature value corresponding to the user tag is determined. A feature vector corresponding to the user identifier is formed according to feature values corresponding to the user tags corresponding to the standard user model. The standard user feature vector can comprehensively reflect vectors of standard user features. Specifically, after determining the target standard user model matching the user identifier, the server obtains a standard user feature vector corresponding to the target standard user model. The standard user feature vector may be directly used as the feature vector corresponding to the user identifier, to facilitate subsequent calculation of the recommendation parameter according to the feature vector. When the user tag set corresponding to the user identifier is not complete enough, matching with preset standard user models is performed, and a feature vector corresponding to a target standard user model obtained through matching is used as the feature vector corresponding to the user identifier, thereby improving the accuracy of recommendation.

In step 204D, the feature vector corresponding to the user identifier is formed according to the user tags in the user tag set and the corresponding image information.

Specifically, when the scale of the user tag set is greater than the preset scale, it indicates that the user tags in the user tag set are relatively complete, and the server can directly determine the feature vector corresponding to the user identifier according to the user tags in the user tag set and the corresponding image information. The feature vector refers to a vector that can reflect features of a user comprehensively.

Figure 6:
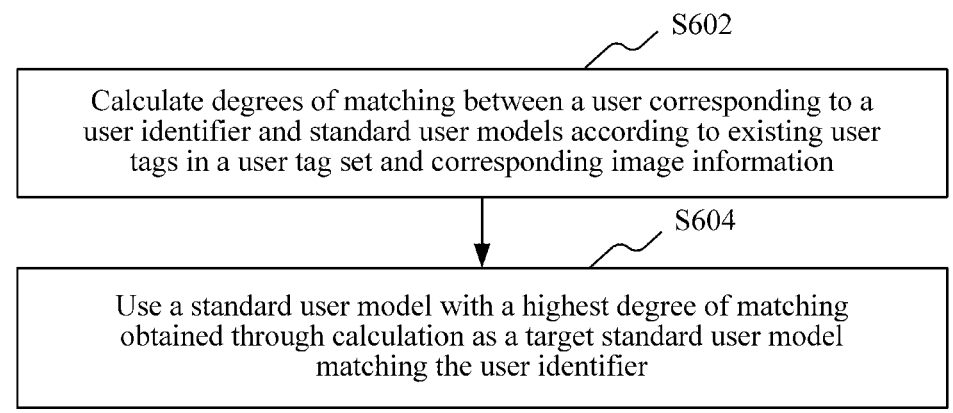
FIG. 6 is a flowchart of a method for determining a target standard user model matching a user identifier in an embodiment.

As shown in FIG. 6, in an embodiment, step S204B of performing matching with preset standard user models according to the existing user tags in the user tag set and the corresponding image information, and determining a target standard user model matching the user identifier includes the following steps:

In step S602, degrees of matching between a user corresponding to the user identifier and the standard user models are calculated according to the existing user tags in the user tag set and the corresponding image information.

The degree of matching refers to a degree of matching between the user corresponding to the user identifier and a standard user represented by the standard user model. The existing user tag refers to a user tag already obtained. Because the user tags in the user tag set are not complete enough, unknown (additional) user tags need to be obtained according to the existing user tags. In order to obtain unknown user tags, preset standard user models need to be obtained first. A standard user model represents a group having the same feature or similar features, and the standard user model corresponds to a standard user tag set. By calculating the degrees of matching between the user and the standard user models, a standard user model matching the user is determined, and a standard user tag set corresponding to the standard user model is used as the user tag set of the user, thereby improving the user tag set of the user. Specifically, the server first determines a current feature value corresponding to each user tag according to the existing user tags and the corresponding image information, then obtains standard feature values corresponding to user tags that are in the standard user models and that are the same as the existing user tags, and calculates degrees of matching between the user corresponding to the user identifier and the standard user models according to the current feature values and the standard feature values.

In step S604, a standard user model with a highest degree of matching obtained through calculation is used as the target standard user model matching the user identifier.

The target standard user model refers to a standard user model that is obtained through calculation and that matches the user tags. Specifically, after calculating the degrees of matching between the user corresponding to the user identifier and the standard user models, the server uses a standard user model, which is obtained through calculation, having a highest degree of matching with the user corresponding to the user identifier as the target standard user model. By means of matching with standard user models, a standard user tag set corresponding to a standard user model is used as the user tag set corresponding to the user identifier, thereby helping improve the accuracy of subsequently recommended information.

Figure 7:
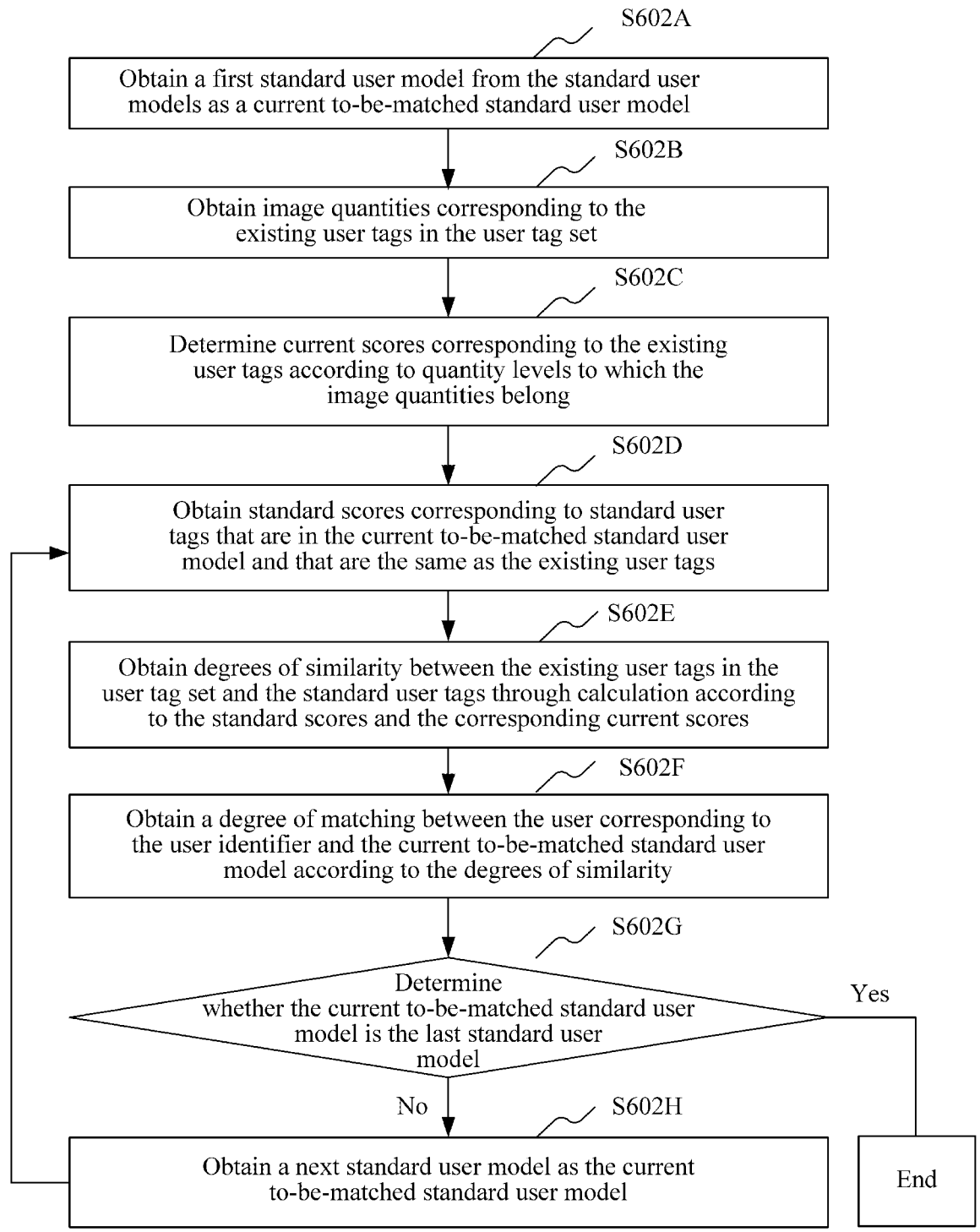
FIG. 7 is a flowchart of a method for calculating degrees of matching between a user corresponding to a user identifier and standard user models in an embodiment.

As shown in FIG. 7, in an embodiment, step S602 of calculating degrees of matching between a user corresponding to the user identifier and the standard user models according to the existing user tags in the user tag set and the corresponding image information includes:

In step S602A, a first standard user model from the standard user models is obtained as a current to-be-matched standard user model.

Specifically, because there are multiple standard user models, a degree of matching with each standard user model needs to be calculated separately. First, the server obtains one standard user model (the first standard user model) from the multiple standard user models as a current to-be-matched standard user model.

In step S602B, image quantities corresponding to the existing user tags in the user tag set are obtained.

Specifically, an image quantity corresponding to an existing user tag is obtained from the image information corresponding to the existing user tag. The image quantity refers to the quantity of pictures. For example, it is assumed that the existing user tags include food, scenery, selfie, group photo, and the like. The image quantity corresponding to the food tag is 7; the image quantity corresponding to the scenery tag is 5; the image quantity corresponding to the selfie tag is 10; and the image quantity corresponding to the group photo tag is 5.

In step S602C, current scores corresponding to the existing user tags are determined according to quantity levels to which the image quantities belong.

The current score refers to a score that corresponds to a user tag and that is determined according to an image quantity corresponding to the user tag. Specifically, a correspondence between image quantities and scores is set in advance. After obtaining an image quantity corresponding to an existing user tag, the server determines a corresponding current score according to a quantity level to which the image quantity belongs. For example, a tag scoring system is set. When an image quantity corresponding to a user tag is in a range of [1, 10), a current score corresponding to the user tag is set to 1; when the image quantity is in the range of [10, 50), the current score corresponding to the user tag is set to 2; when the image quantity is in the range of [50, 100), the current score corresponding to the user tag is set to 3; when the image quantity is in the range of [100, 200), the current score corresponding to the user tag is set to 4; when the image quantity is 200 or more, the current score corresponding to the user tag is set to 5. It is assumed that existing user tags of a user A include the following three tags: food, game, and scenery, where there are 10 food images, 5 game images, and 20 scenery images. In this case, current scores corresponding to the existing user tags of the user A are as follows: a score of 2 corresponding to the food tag, a score of 1 corresponding to the game tag, and a score of 2 corresponding to the scenery tag.

In step S602D, standard scores corresponding to standard user tags that are in the current to-be-matched standard user model and that are the same as the existing user tags are obtained.

The standard score refers to a score corresponding to a standard user tag in a standard user model. First, standard user tags that are in the current to-be-matched standard user model and that are the same as the existing user tags are obtained, and then corresponding standard scores are obtained. It is assumed that the existing user tags include food, game, and scenery. In this case, food, game and scenery tags in the standard user model are obtained, and then standard scores corresponding to the food, game, and scenery are obtained. If a standard user tag that is the same as the existing user tag does not exist in the standard user tags, a standard score of the corresponding standard user tag is 0. For example, there is no food user tag in the standard user tag set corresponding to the standard user model, a standard score corresponding to the food tag in the standard user model is set to 0.

In step S602E, degrees of similarity between the existing user tags in the user tag set and the standard user tags are obtained through calculation according to the standard scores and the corresponding current scores.

The degree of similarity refers to a degree of similarity between a user tag corresponding to a current user and a standard user tag in a standard user model. The standard user tag refers to a tag that is in a standard user model and that is the same as an existing user tag. In an embodiment, a degree of similarity between the existing user tag and the standard user tag is determined according to a ratio between scores corresponding to the existing user tag and the standard user tag, that is, determined according to a ratio between the current score and the standard score. A greater one in the current score and the standard score is used as a denominator, and a smaller one is used as a numerator. Then, a degree of similarity between the two is determined. For example, if a food tag corresponds to a current score of 2 and a standard score of 3, 2 is used as a numerator and 3 is used as a denominator to obtain that a degree of similarity between the two is 2/3. A degree of similarity between each existing user tag and each standard user tag can be obtained through calculation in this manner.

In step S602F, a degree of matching between the user corresponding to the user identifier and the current to-be-matched standard user model is obtained according to the degrees of similarity.

After the degree of similarity between each existing user tag and each standard user tag is obtained through calculation, a degree of matching between the user corresponding to the user identifier and the current to-be-matched standard user model is calculated according to the degrees of similarity. In an embodiment, the server may use a sum of the degrees of similarity between all the existing user tags and the standard user tags as a degree of matching between the user and the current to-be-matched standard user model. For example, it is assumed that existing user tags corresponding to a user A include performance, scenery, screenshot, and beauty. As shown in Table 1, a current score corresponding to the performance is 3, a current score corresponding to the scenery is 1, a current score corresponding to the screenshot is 2, and a current score corresponding to the beauty is 1. Scores of the corresponding standard user tags in a standard user model 1 are as follows: a standard score corresponding to the performance is 0, a standard score corresponding to the scenery is 2, a standard score corresponding to the screenshot is 4, and a standard score corresponding to the beauty is 1.

TABLE 1

| User | Performance | Scenery | Screenshot | Beauty |
|---|---|---|---|---|
| User A | Score of 3 | Score of 1 | Score of 2 | Score of 1 |
| Standard user model 1 | Score of 0 | Score of 2 | Score of 4 | Score of 1 |

First, degrees of similarity corresponding to tags are calculated. A degree of similarity corresponding to the performance tag is 0, a degree of similarity corresponding to the scenery tag is 1/2, a degree of similarity corresponding to the screenshot tag is 2/4, a degree of similarity corresponding to the beauty tag is 1. If a sum of the degrees of similarity is directly used as a degree of matching, the degree of matching=0+1/2+2/4+1=2. In another embodiment, the degree of matching equals the total degree of similarity divided by a total user tag quantity, that is, the degree of matching=total degree of similarity/tag quantity.

In step S602G, a determination is made as to whether the current to-be-matched standard user model is the last standard user model; if yes, the process ends; otherwise, step S602H is performed.

Specifically, if the current to-be-matched standard user model is the last standard user model, the process is ended. If the current to-be-matched standard user model is not the last standard user model, a next standard user model is obtained continuously and used as the current to-be-matched standard user model, and a degree of matching between the user and the next standard user model is calculated continuously.

In step S602H, a next standard user model is obtained as the current to-be-matched standard user model, and steps S602D to S602G are performed repeatedly.

After calculating the degree of matching between the user and the current standard user model, the server obtains a next standard user model as the current to-be-matched standard user model, and then repeatedly performs the step of obtaining standard scores corresponding to standard user tags that are in the current to-be-matched standard user model and that are the same as the existing user tags, until the degrees of matching between the user and the standard user models are obtained.

Figure 8:
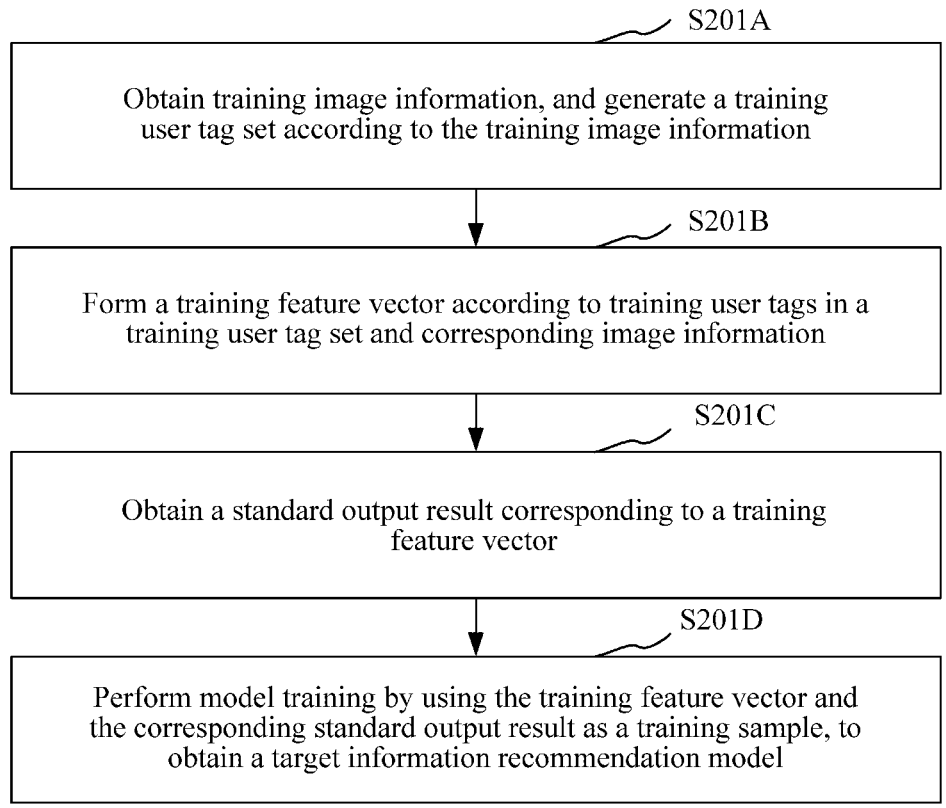
FIG. 8 is a flowchart of a method for establishing an information recommendation model in an embodiment.

As shown in FIG. 8, before the step of processing the feature vector according to a trained information recommendation model, to obtain a recommendation parameter of to-be-recommended information, the method further includes: establishing an information recommendation model. The step of establishing an information recommendation model includes the following steps:

In step S201A: training image information is obtained, and a training user tag set is generated according to the training image information.

The training image information refers to image information used as training data of an information recommendation model. The training user tag set is obtained according to the training image information. Classification processing the same as that performed during the foregoing prediction is performed on the training image information to obtain a training user tag set. The training user tag set includes multiple training user tags. The training user tags represent features of a user. The training user tag may be one or more of an age, a gender, a hobby, a financial capability, and a schedule of a training user. The processing manner of obtaining training image information and generating a training user tag set according to the training image information during establishment of an information recommendation model is kept consistent with the processing manner of obtaining image information and generating a user tag set according to the image information before use of a trained information recommendation model, and extracted user tags are also kept consistent.

In step S201B, a training feature vector is formed according to training user tags in the training user tag set and the corresponding image information.

Each user tag in the training user tag set represents one user feature. According to image information corresponding to each training user tag, a training feature value corresponding to the training user tag is determined. A training feature vector is formed according to training feature values corresponding to all the training user tags. The training feature vector refers to a vector that can comprehensively reflect features of a training user.

In step S201C, a standard output result corresponding to the training feature vector is obtained.

The standard output result refers to a known result corresponding to the training feature vector. Image information with a known user behavior result is used as training data, and the corresponding known behavior result is used as a standard output result.

In step S201D, model training is performed by using the training feature vector and the corresponding standard output result as a training sample, to obtain a target information recommendation model.

The training sample is used for training the model, so as to learn about parameters of the model and obtain an information recommendation model through training. Training is performed by using the training feature vector representing the features of the training user as an input of a to-be-trained information recommendation model, and using the corresponding standard output result as an expected output. In the training process, model parameters of the information recommendation model are adjusted continuously, so that an actually output recommendation result is constantly closer to a standard output result, and training of the model is completed until an error between the actually output recommendation result and the standard output result meets a condition. Specifically, there are multiple methods for training the information recommendation model, for example, multiple machine learning models such as linear regression, a neural network, and a support vector machine.

A specific training process is introduced below by using a training algorithm of a linear regression model as an example. 1) Training features are determined. Training features are determined according to user tags in a user tag set and corresponding image information. For example, it is set that there are 12 user features, including an age, a gender, a total image quantity, a quantity of classified albums, a quantity of domestic travel albums, a quantity of overseas travel albums, a quantity of holiday albums, a quantity of baby pictures, a quantity of scenery pictures, a quantity of selfie pictures, a quantity of group photo pictures, and a quantity of food pictures of the user. 2) A feature vector is formed according to the determined training features. An arrangement order of the features in the feature vector is set. For example, it is set that feature vector=<age, gender, total image quantity, quantity of classified albums, quantity of domestic travel albums, quantity of overseas travel albums, quantity of holiday albums, quantity of baby pictures, quantity of scenery pictures, quantity of selfie pictures, quantity of group photo pictures, quantity of food pictures>. 0 or 1 is used for representing the gender of male or female. For example, a 20-year-old male user has a total of 200 pictures, 5 classified albums, 3 domestic travel albums, 1 overseas travel album, 1 holiday album, 0 baby pictures, 50 scenery pictures, 10 selfie pictures, 100 group photo pictures, and 40 food pictures. A corresponding feature vector may be represented as <20, 0, 200, 5, 3, 1, 1, 0, 50, 10, 100, 40>0.3) User behavior data corresponding to the feature vector is obtained. For example, it is labeled as 1 if the to-be-recommended information is clicked, and it is labeled as 0 if the to-be-recommended information is not clicked. 4) Training data is determined. A piece of complete training data is represented as <feature vector, label>0.5) A model training method based on training regression is used. First, it is assumed that user features and behavior results meet a linear relationship, and a corresponding formula is represented as follows: $f(\vec{x}) = w\vec{x} + b$, where $\vec{x}$ represents a feature vector, w represents a weight matrix, and b represents an offset matrix. Linear regression means fitting an output of the training data and a standard output by using a curve, so that an error between the output of the training data and the standard output is as small as possible. Specifically, a loss function is defined as follows:

$$J(w) = \frac{1}{2}\sum_{i=1}^{n}(f(x_i) - y_i)^2,$$

which represents a mean square error between an actual output value and a standard output value, where n represents n pieces of training data, $f(x_i)$ represents an actual output of an $i^{th}$ piece of training data, and $y_i$ represents a standard output result corresponding to the $i^{th}$ piece of training data. The objective is to minimize the loss function by adjusting the weight and the offset. A specific solution method may be a gradient descent method, a least square method, or the like.

Figure 9:
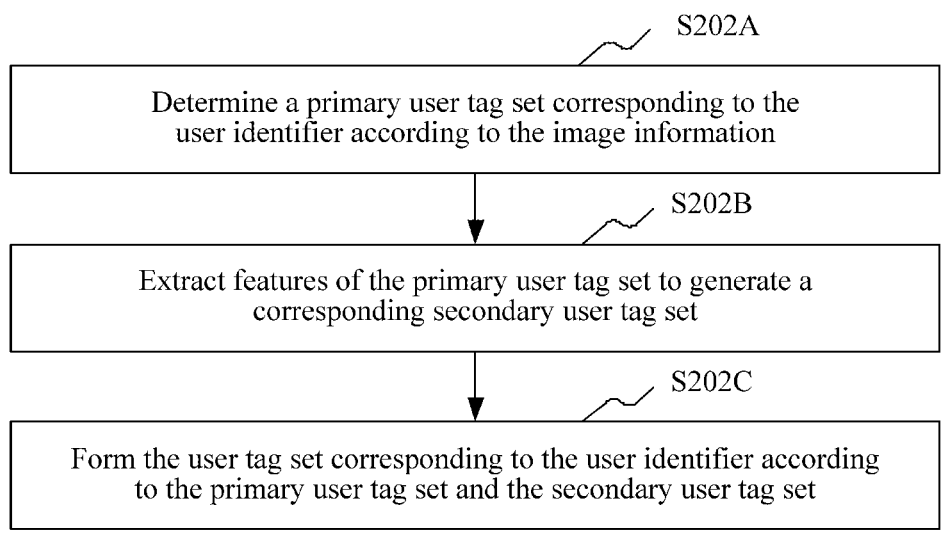
FIG. 9 is a flowchart of a method for generating a user tag set corresponding to a user identifier according to image information in an embodiment.

As shown in FIG. 9, the step of generating a user tag set corresponding to the user identifier according to the image information includes the following steps:

In step S202A, a primary user tag set corresponding to the user identifier is determined according to the image information.

A primary user tag refers to a user tag that can be directly obtained according to the image information. That is, user tags that can be obtained according to information of the image itself are referred to as "primary user tags", and a tag set formed by the primary user tags is referred to as a "primary user tag set". The image information includes image content information, image acquisition information, image quantity information, and the like. All user tags directly obtained according to the image content information, the image acquisition information, and the image quantity information are primary user tags. For example, user tags such as scenery, group photo, selfie, and food that are directly obtained through classification according to the image content information are all primary user tags.

In step S202B, features of the primary user tag set are extracted to generate a corresponding secondary user tag set.

A secondary user tag refers to a tag indirectly obtained by extracting a feature of a primary user tag. Specifically, a mapping relationship between primary user tags and secondary user tags are set in advance, where the primary user tags may be in a many-to-one relationship with the secondary user tags. A corresponding secondary user tag is determined by extracting features corresponding to primary tags. For example, a corresponding secondary user tag is determined according to features corresponding to three tags: "baby", "gender", and "age", corresponding to the user. For example, it is assumed that a photo quantity (feature) corresponding to the "baby" tag is 100, a feature corresponding to the gender tag is female, and a feature corresponding to the age tag is 25. Then, it can be inferred that the user is a young mom, and correspondingly, "young mom" is used as a secondary tag of the user. A social attribute of the user is extracted according to a group photo quantity (feature) corresponding to the "group photo" tag corresponding to the user. If the group photo tag corresponds to a large quantity of photos, it can be inferred that the user is a "sociable" user, and "sociable" is used as a secondary tag of the user. A financial capability of the user can be inferred according to a photographing machine model and a photographing location of the user. For example, if the user corresponds to an ordinary photographing machine model and an ordinary photographing location, it indicates that the user has a normal financial capability, and "normal financial capability" is used as a corresponding secondary user tag.

In step S202C, the user tag set corresponding to the user identifier is formed according to the primary user tag set and the secondary user tag set.

Specifically, in order to recommend information more desirably and accurately, the obtained primary user tag set and secondary user tag set are both used as the user tag set corresponding to the user identifier. That is, the user tag set includes both primary user tags and secondary user tags. With the addition of the secondary user tags, it helps further improve the accuracy of information recommendation.

Figure 10:
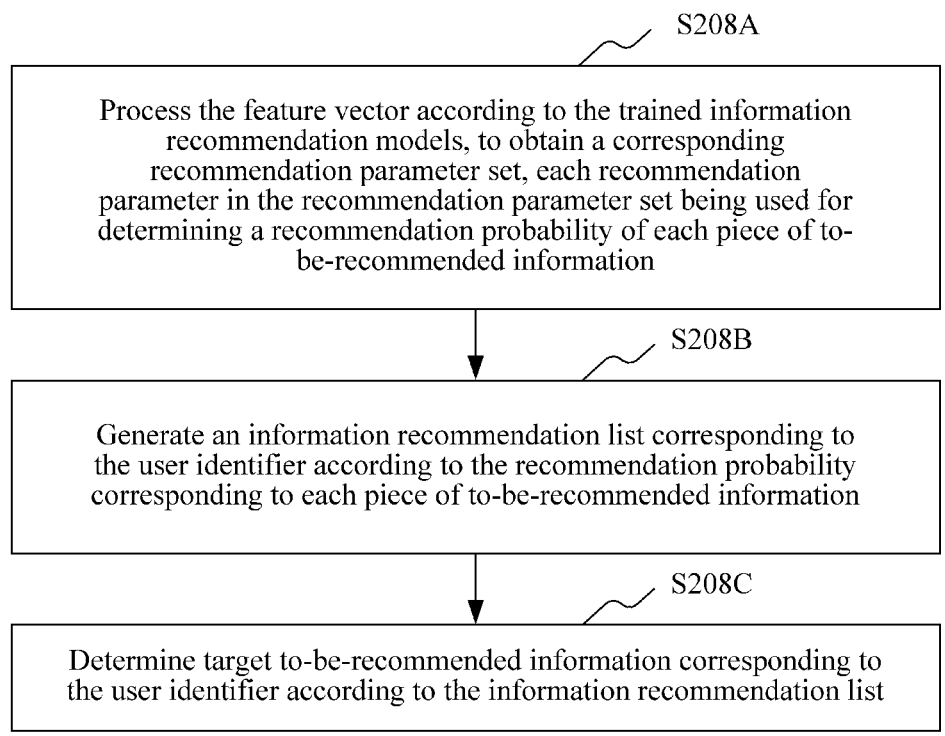
FIG. 10 is a flowchart of a method for inputting a feature vector into a trained information recommendation model and outputting a recommendation parameter of to-be-recommended information in an embodiment.

As shown in FIG. 10, there are multiple pieces of to-be-recommended information, and each piece of to-be-recommended information has a corresponding information recommendation model; step S208 of processing the feature vector according to a trained information recommendation model, to obtain a recommendation parameter of to-be-recommended information includes the following steps:

In step S208A, the feature vector is processed according to the trained information recommendation models, to obtain a corresponding recommendation parameter set, each recommendation parameter in the recommendation parameter set being used for determining a recommendation probability of each piece of to-be-recommended information.

When there are multiple pieces of to-be-recommended information, each piece of to-be-recommended information has a corresponding information recommendation model, that is, there are multiple information recommendation models correspondingly. The feature vector is processed according to the trained information recommendation models, to obtain a recommendation parameter outputted by each information recommendation model, thereby forming a recommendation parameter set. Each recommendation parameter in the recommendation parameter set is used for determining a recommendation probability of each piece of to-be-recommended information. Specifically, it is assumed that there are N pieces of to-be-recommended information, and there are N information recommendation models correspondingly; then, N recommendation parameters are obtained. A recommendation probability of a corresponding piece of to-be-recommended information is determined according to each recommendation parameter. That is, N recommendation probabilities are determined according to N recommendation parameters.

In step S208B, an information recommendation list corresponding to the user identifier is generated according to the recommendation probability corresponding to each piece of to-be-recommended information.

Specifically, after determining the recommendation probability corresponding to each piece of to-be-recommended information, the server generates an information recommendation list corresponding to the user identifier according to values of the recommendation probabilities. In an embodiment, according to the recommendation probabilities corresponding to the to-be-recommended information, the to-be-recommended information is sorted in descending order of the recommendation probabilities to generate the information recommendation list.

In step S208C, target to-be-recommended information corresponding to the user identifier is determined according to the information recommendation list.

Specifically, after determining the information recommendation list, the server determines target to-be-recommended information corresponding to the user identifier according to the information recommendation list. In an embodiment, a preset quantity of first pieces of information (for example, first three pieces of information) in the information recommendation list is used as the target to-be-recommended information for pushing. In another embodiment, to-be-recommended information whose recommendation probability is greater than a preset probability threshold (such as 60%) in the information recommendation list is used as the target to-be-recommended information for pushing.

In an embodiment, the step of recommending the to-be-recommended information to a terminal corresponding to the user identifier according to the recommendation parameter includes: pushing the to-be-recommended information to the terminal corresponding to the user identifier in a form of a picture if the recommendation parameter is greater than a preset threshold.

A value of the recommendation parameter reflects a level of interest of the user in the to-be-recommended information. A recommendation parameter threshold is set in advance. When the recommendation parameter is greater than the preset threshold, the to-be-recommended information is pushed to the terminal corresponding to the user identifier in a form of a picture. For example, during advertisement push, advertisement content is disguised as a photo and issued to a user interface, to attract attention of the user.

Figure 11:
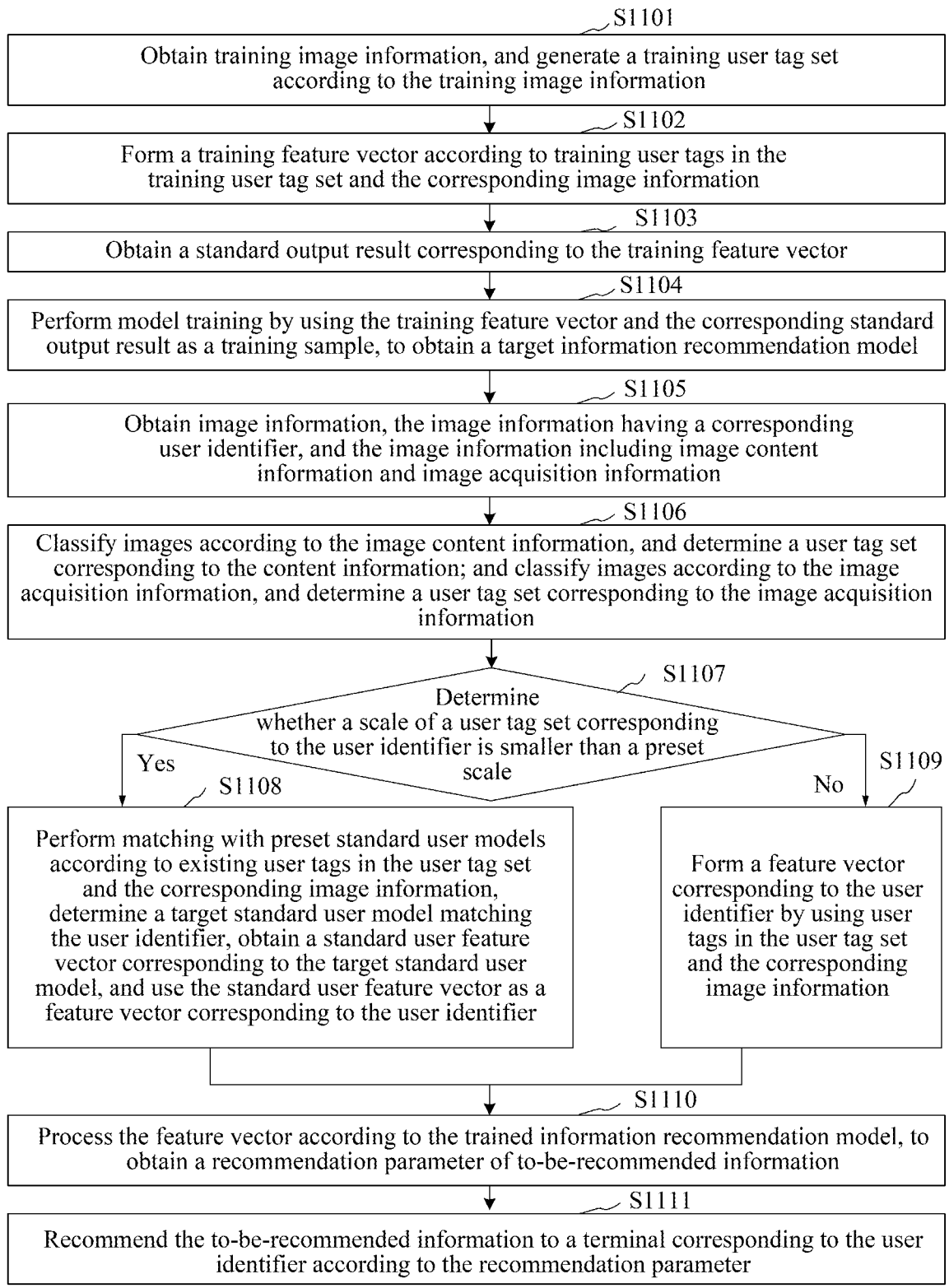
FIG. 11 is a flowchart of an information recommendation method in another embodiment.

As shown in FIG. 11, an information recommendation method is proposed. The method includes the following steps:

In step S1101, training image information is obtained, and a training user tag set is generated according to the training image information.

In step S1102, a training feature vector is formed according to training user tags in the training user tag set and the corresponding image information.

In step S1103, a standard output result corresponding to the training feature vector is obtained.

In step S1104, model training is performed by using the training feature vector and the corresponding standard output result as a training sample, to obtain a target information recommendation model.

In step S1105, image information is obtained. The image information has a corresponding user identifier, and includes image content information and image acquisition information.

In step S1106, images are classified according to the image content information, and a user tag set corresponding to the content information is determined. Further, images are classified according to the image acquisition information, and a user tag set corresponding to the image acquisition information is determined.

In step S1107, a determination is made as to whether a scale of a user tag set corresponding to the user identifier is less than a preset scale; if yes, step S1108 is performed; otherwise, step S1109 is performed.

In step S1108, matching with preset standard user models is performed according to existing user tags in the user tag set and the corresponding image information, a target standard user model matching the user identifier is determined, a standard user feature vector corresponding to the target standard user model is obtained, and the standard user feature vector is used as a feature vector corresponding to the user identifier.

In step S1109, a feature vector corresponding to the user identifier is formed by using user tags in the user tag set and the corresponding image information.

In step S1110, the feature vector is processed according to the trained information recommendation model, to obtain a recommendation parameter of to-be-recommended information.

In step S1111, the to-be-recommended information is recommended to a terminal corresponding to the user identifier according to the recommendation parameter.

Figure 12:
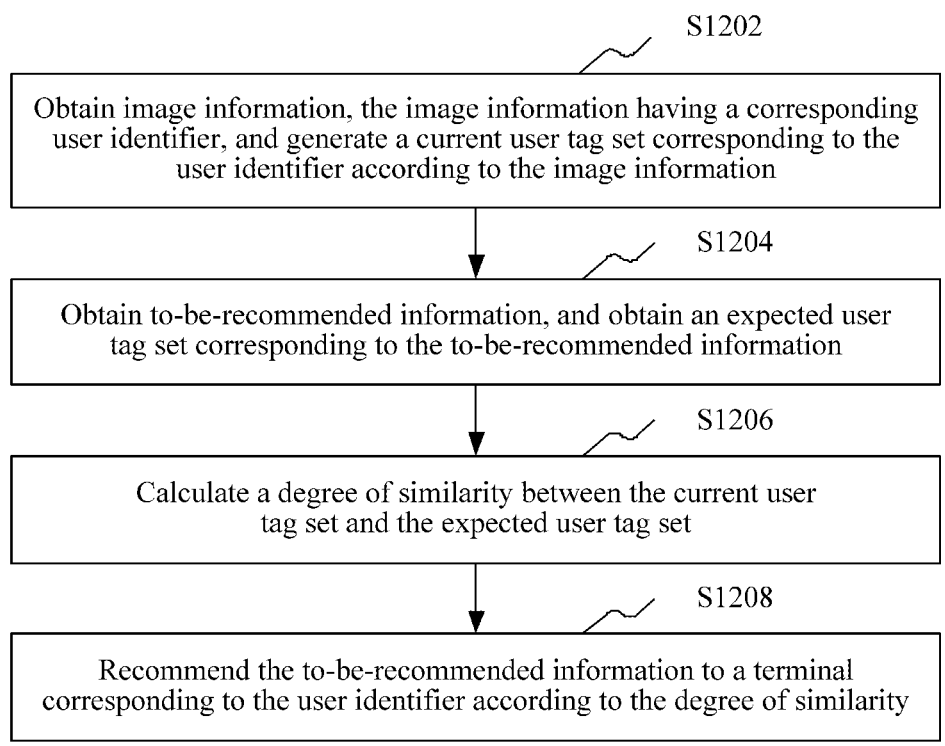
FIG. 12 is a flowchart of an information recommendation method in still another embodiment.

As shown in FIG. 12, in an embodiment, an information recommendation method is proposed. The method includes the following steps:

In step S1202, image information is obtained. The image information has a corresponding user identifier. A current user tag set corresponding to the user identifier is generated according to the image information.

The image information includes at least one of image content information, image acquisition information, and image quantity information. The image may be a picture or a video. The video may be considered as consisting of, or including, frames of pictures. The obtained image information corresponds to a user identifier. The user identifier is used for uniquely identifying a user. The user identifier may be an account registered by the user, a terminal identifier, a unique number allocated to the user, or the like. The current user tag set includes multiple current user tags, and the current user tags represent features of the current user. The current user tag may be an age, a gender, a hobby, a financial capability, a schedule, and the like of the user. In an embodiment, the image information may be information obtained by a terminal by recognizing an image. For example, the terminal first recognizes image content by using an image recognition technology, and then uploads the recognized image content to a server. The server obtains image information, and performs classification according to the obtained image information. For example, the server uniformly classifies a recognized mountain, sea, snowfield, sky, and the like into a scenery class, and uniformly classifies images including two or more characters into a group photo class. Then, a current user tag set corresponding to the user identifier is generated according to a classification result. For example, current user tags include scenery, group photo, selfie, food, and the like. In another embodiment, the image information may be an image itself. The terminal directly uploads images in the terminal to the server. Then, the server recognizes the images by using a photo recognition technology, performs classification according to a recognition result, and then generates a current user tag set corresponding to the user identifier according to a classification result.

In step S1204, to-be-recommended information and an expected user tag set corresponding to the to-be-recommended information are obtained.

The expected user tag set is used for representing features corresponding to a target user group corresponding to the to-be-recommended information. The expected user tag set corresponding to the to-be-recommended information is set in advance. In an embodiment, the expected user tag set may be determined in the following manner: obtaining a known user group interested in the to-be-recommended information, and using common user tags of the user group as expected user tags, to form the expected user tag set.

In step S1206, a degree of similarity is calculated between the current user tag set and the expected user tag set.

In order to determine whether the current user is a target user corresponding to the to-be-recommended information, after obtaining the current user tag set corresponding to the current user, the server calculates a degree of similarity between the current user tag set and the expected user tag set, so as to determine whether the current user is the target user corresponding to the to-be-recommended information according to the degree of similarity. In an embodiment, the degree of similarity between the current user tag set and the expected user tag set may be calculated by calculating an overlapping degree between current user tags in the current user tag set and expected user tags in the expected user tag set. For example, there are 20 current user tags in the current user tag set, there are 25 expected user tags in the expected user tag set, and there are 15 overlapping user tags between the current user tags and the expected user tags. In this case, an overlapping degree between the current user tags and the expected user tags is 15/25. The overlapping degree between the current user tags and the expected user tags may be used as a degree of similarity, that is, the degree of similarity between the current user tag set and the expected user tag set is 3/5. To calculate the degree of similarity between the current user tag set and the expected user tag set more accurately, in an embodiment, in addition to obtaining the user tags, it is also necessary to obtain a feature value of each user tag. That is, in addition to calculating the overlapping degree between user tags, it is also necessary to calculate a degree of similarity between identical user tags, specifically determine degrees of similarity of tags according to feature values corresponding to the current user tags and feature values corresponding to the expected user tags, and determine a degree of similarity between the current user tag set and the expected user tag set according to the degree of similarity of each user tag.

In step S1208, the to-be-recommended information is recommended to a terminal corresponding to the user identifier according to the degree of similarity.

Specifically, a similarity degree threshold is set in advance. It is determined whether the obtained degree of similarity through calculation is greater than the preset similarity degree threshold; if yes, the to-be-recommended information is recommended to the terminal corresponding to the user identifier; otherwise, the to-be-recommended information is not recommended.

In the foregoing information recommendation method, a current user tag set that can reflect user features is established by using image information; an expected user tag set corresponding to information to be recommended is obtained; and the information is recommended to a terminal corresponding to a user identifier according to a degree of similarity between the current user tag set and the expected user tag set. This method not only improves the accuracy of recommendation, but also avoids disturbing users who are not interested in the information.

In an embodiment, step S1202 of obtaining image information, the image information having a corresponding user identifier, and generating a user tag set corresponding to the user identifier according to the image information includes: obtaining image information, the image information having a corresponding user identifier, and generating a primary user tag set corresponding to the user identifier according to the image information; and extracting features of the primary user tag set to generate a corresponding secondary user tag set.

Figure 13:
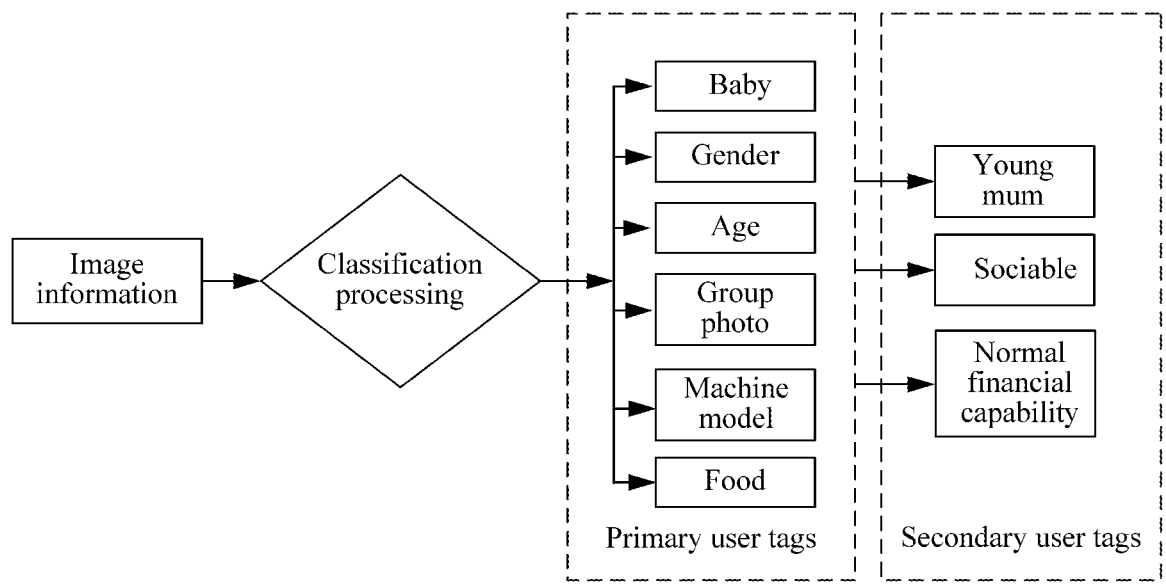
FIG. 13 is a schematic flowchart of obtaining a secondary user tag according to image information in an embodiment.

A primary user tag refers to a user tag that can be directly obtained according to the image information. That is, user tags that can be obtained according to information of the image itself are referred to as "primary user tags", and a tag set formed by the primary user tags is referred to as a "primary user tag set". The image information includes image content information, image acquisition information, image quantity information, and the like. All user tags directly obtained according to the image content information, the image acquisition information, and the image quantity information are primary user tags. For example, user tags such as scenery, group photo, selfie, and food that are directly obtained through classification according to the image content information are all primary user tags. A secondary user tag refers to a tag indirectly obtained by extracting a feature of a primary user tag. Specifically, a mapping relationship between primary user tags and secondary user tags are set in advance, where the primary user tags may be in a many-to-one relationship with the secondary user tags. A corresponding secondary user tag is determined by extracting features corresponding to primary tags. For example, a corresponding secondary user tag is determined according to features corresponding to three tags: "baby", "gender", and "age", corresponding to the user. For example, it is assumed that a photo quantity (feature) corresponding to the "baby" tag is 100, a feature corresponding to the gender tag is female, and a feature corresponding to the age tag is 25. Then, it can be inferred that the user is a young mom, and correspondingly, "young mom" is used as a secondary tag of the user. A social attribute of the user is extracted according to a group photo quantity (feature) corresponding to the "group photo" tag corresponding to the user. If the group photo tag corresponds to a large quantity of photos, it can be inferred that the user is a "sociable" user, and "sociable" is used as a secondary tag of the user. A financial capability of the user can be inferred according to a photographing machine model and a photographing location of the user. For example, if the user corresponds to an ordinary photographing machine model and an ordinary photographing location, it indicates that the user has a normal financial capability, and "normal financial capability" is used as a corresponding secondary user tag. FIG. 13 shows a schematic flowchart of obtaining primary user tags from image information and then obtaining secondary user tags from the primary user tags in an embodiment.

Step S1206 of calculating a degree of similarity between the current user tag set and the expected user tag set includes: calculating a degree of similarity between the secondary user tag set and the expected user tag set.

The expected user tags in the expected user tag set may be secondary user tags corresponding to the target user group. After obtaining the secondary user tag set corresponding to the current user, the server calculates a degree of similarity between the secondary user tag set corresponding to the current user and the expected user tag set. Specifically, a degree of tag similarity between each secondary user tag and a corresponding expected user tag may be calculated first, and then the degree of similarity between the secondary user tag set and the expected user tag set is calculated according to the degrees of tag similarity.

Figure 14:
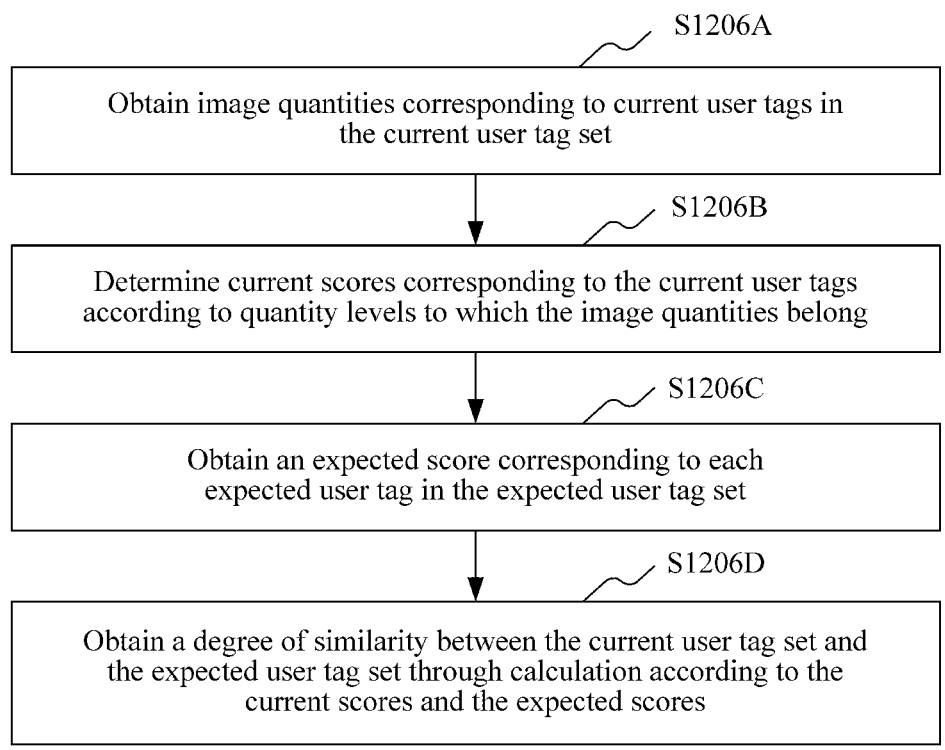
FIG. 14 is a flowchart of a method for calculating a degree of similarity between a current user tag set and an expected user tag set in an embodiment.

As shown in FIG. 14, in an embodiment, step S1206 of calculating a degree of similarity between the current user tag set and the expected user tag set includes the following steps:

In step S1206A, image quantities corresponding to current user tags in the current user tag set are obtained.

Image quantities corresponding to the current user tags are obtained from the image information corresponding to the current user tag set. The image quantity refers to a quantity of pictures. For example, it is assumed that the user tags include food, scenery, selfie, group photo, and the like. The image quantity corresponding to the food tag is 7; the image quantity corresponding to the scenery tag is 5; the image quantity corresponding to the selfie tag is 10; and the image quantity corresponding to the group photo tag is 5.

In step S1206B, current scores corresponding to the current user tags are determined according to quantity levels to which the image quantities belong.

The current score refers to a score that corresponds to a current user tag and that is determined according to an image quantity corresponding to the current user tag. Specifically, a correspondence between image quantities and scores is set in advance. After obtaining an image quantity corresponding to a current user tag, the server determines a corresponding current score according to a quantity level to which the image quantity belongs. For example, a tag scoring system is set. When an image quantity corresponding to a user tag is in a range of [1, 10), a current score corresponding to the user tag is set to 1; when the image quantity is in the range of [10, 50), the current score corresponding to the user tag is set to 2; when the image quantity is in the range of [50, 100), the current score corresponding to the user tag is set to 3; when the image quantity is in the range of [100, 200), the current score corresponding to the user tag is set to 4; when the image quantity is 200 or more, the current score corresponding to the user tag is set to 5. It is assumed that current user tags of a user A include the following three tags: food, game, and scenery, where there are 10 food images, 5 game images, and 20 scenery images. In this case, current scores corresponding to the current user tags of the user A are as follows: a score of 2 corresponding to the food tag, a score of 1 corresponding to the game tag, and a score of 2 corresponding to the scenery tag.

In step S1206C, an expected score corresponding to each expected user tag in the expected user tag set is obtained.

The expected score refers to a score corresponding to the expected user tag in the expected user tag set. An expected score corresponding to each expected user tag in the expected user tag set is set advance. A manner for setting the expected scores is kept consistent with a manner of determining the current scores corresponding to the current user tags.

In step S1206D, a degree of similarity between the current user tag set and the expected user tag set through calculation is obtained according to the current scores and the expected scores.

The degree of similarity refers to a degree of similarity between a current user tag set corresponding to a current user and an expected user tag set. Specifically, first, a degree of tag similarity between each current user tag in the current user tag set and an expected user tag in the corresponding expected user tag set is calculated. Then, a degree of similarity between the current user tag set and the expected user tag set is calculated through calculation according to the degree of tag similarity of each user tag. In an embodiment, a degree of tag similarity between the current user tag and the expected user tag is determined according to a ratio between scores corresponding to the current user tag and the expected user tag, that is, determined according to a ratio between the current score and the expected score. A greater one in the current score and the standard score is used as a denominator, and a smaller one is used as a numerator. Then, a degree of similarity between the two is determined. For example, if a food tag corresponds to a current score of 2 and an expected score of 3, 2 is used as a numerator and 3 is used as a denominator to obtain that a degree of similarity between the two is 2/3. A degree of tag similarity between each current user tag and each expected user tag can be obtained through calculation in this manner. The calculation of the degree of tag similarity is calculation for identical tags. For example, a degree of tag similarity between a "food" tag in the current tag set and a "food" tag in the expected tag set is calculated. After the degree of tag similarity corresponding to each user tag is calculated, a degree of similarity between the current user tag set and the expected user tag set can be determined. In an embodiment, a sum of all the degrees of tag similarity may be directly used as the degree of similarity between the current user tag set and the expected user tag set.

Figure 15:
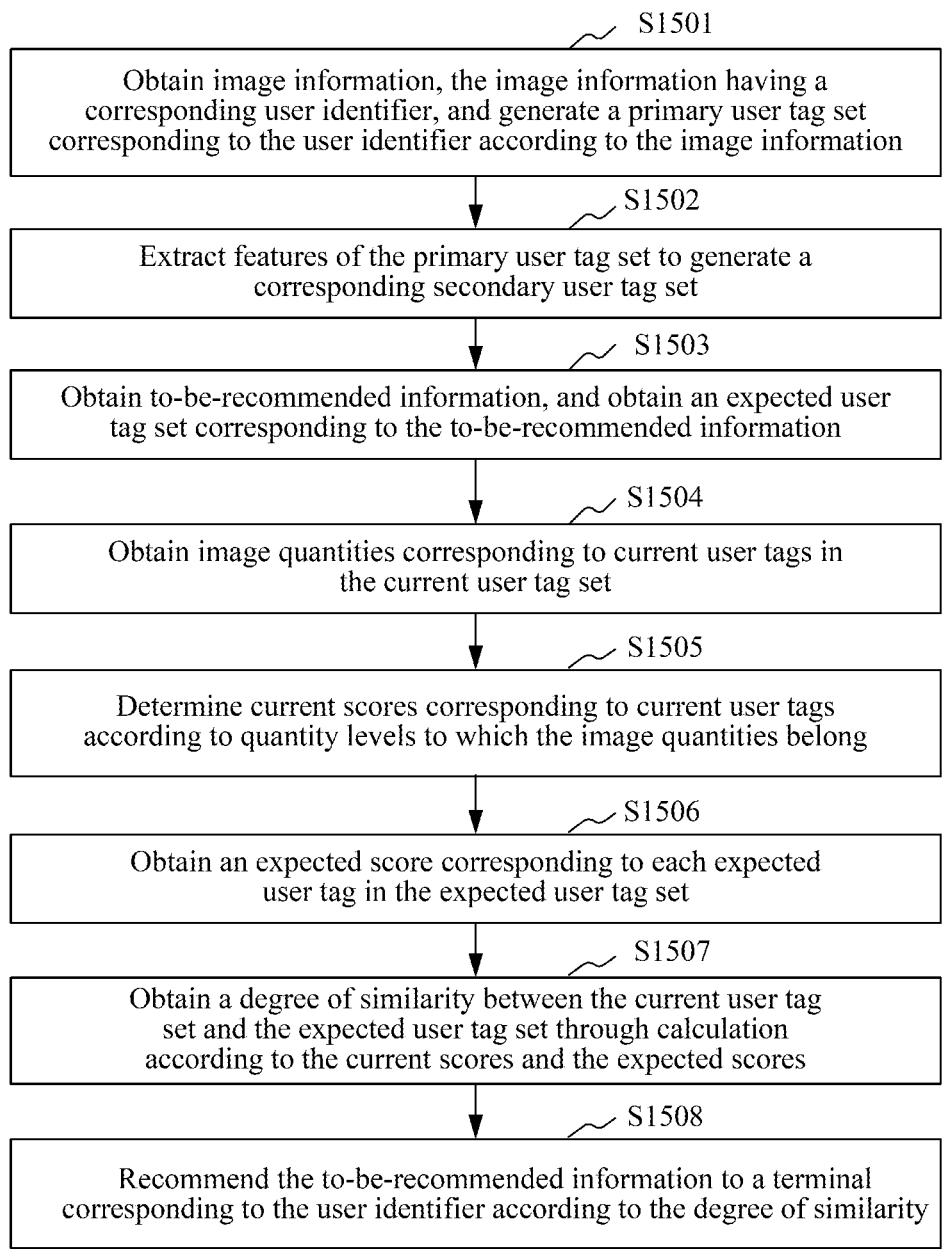
FIG. 15 is a flowchart of an information recommendation method in another embodiment.

As shown in FIG. 15, in an embodiment, an information recommendation method is proposed. The method includes the following steps:

In step S1501, image information is obtained. The image information has a corresponding user identifier. A primary user tag set corresponding to the user identifier is generated according to the image information.

In step S1502, features of the primary user tag set to generate a corresponding secondary user tag set are extracted.

In step S1503, to-be-recommended information and an expected user tag set corresponding to the to-be-recommended information are obtained.

In step S1504, image quantities corresponding to current user tags in the current user tag set are obtained.

In step S1505, current scores corresponding to current user tags are determined according to quantity levels to which the image quantities belong.

In step S1506, an expected score corresponding to each expected user tag in the expected user tag set is obtained.

In step S1507, a degree of similarity between the current user tag set and the expected user tag set through calculation is obtained according to the current scores and the expected scores.

In step S1508, the to-be-recommended information is recommended to a terminal corresponding to the user identifier according to the degree of similarity.

It is to be appreciated that, steps in the embodiments of this application are not necessarily performed according to a sequence indicated by numbers of the steps. Unless otherwise stated clearly in this specification, performing of the steps is not limited by a strict sequence. The steps may be performed according to other sequences. Moreover, at least some of the steps in the embodiments may include multiple sub-steps or multiple stages. The sub-steps or stages are not necessarily performed at the same moment, but can be performed at different moments. The sub-steps or states are not necessarily performed sequentially, but can be performed in turn or alternately with other steps or at least some of sub-steps or stages of other steps.

Figure 16:
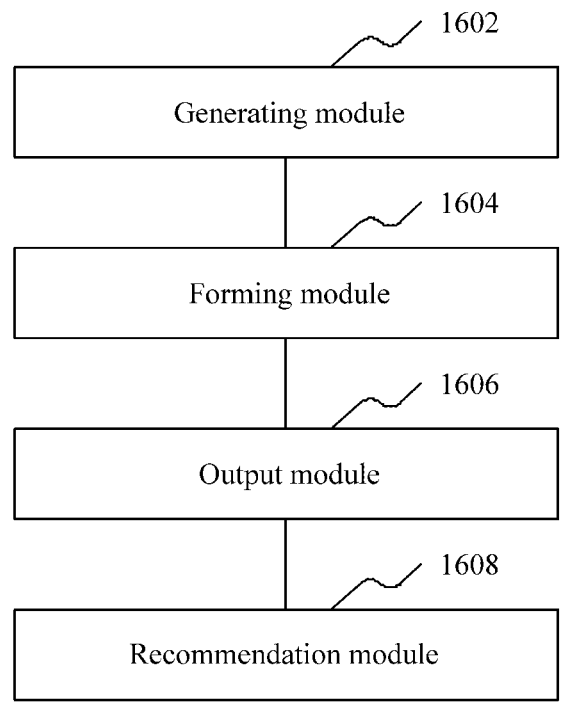
FIG. 16 is a structural block diagram of an information recommendation apparatus in an embodiment.

As shown in FIG. 16, in an embodiment, an information recommendation apparatus is proposed. The apparatus includes a generating module 1602, a forming module 1604, an output module 1606, and a recommendation module 1608. The generating module 1602 is configured to obtain image information, the image information having a corresponding user identifier, and generate a user tag set corresponding to the user identifier according to the image information. The forming module 1604 is configured to form a feature vector corresponding to the user identifier according to user tags in the user tag set and the corresponding image information. The output module 1606 is configured to process the feature vector according to a trained information recommendation model, to obtain a recommendation parameter of to-be-recommended information. The recommendation module 1608 is configured to recommend the to-be-recommended information to a terminal corresponding to the user identifier according to the recommendation parameter.

In an embodiment, the image information includes image content information and image acquisition information; and the generating module is further configured to: classify images according to the image content information, determine a user tag set corresponding to the content information, and classify the images according to the image acquisition information, and determine a user tag set corresponding to the image acquisition information.

Figure 17:
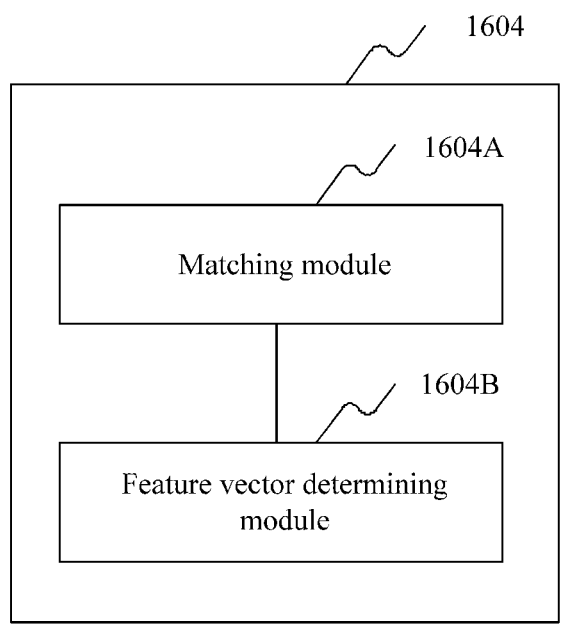
FIG. 17 is a structural block diagram of a forming module in an embodiment.

As shown in FIG. 17, in an embodiment, the forming module 1604 includes a matching module 1604A and a feature vector determining module 1604B. The matching module 1604A is configured to perform matching with preset standard user models according to the existing user tags in the user tag set and the corresponding image information in a case that a scale of the user tag set corresponding to the user identifier is less than a preset scale, and determine a target standard user model matching the user identifier. The feature vector determining module 1604B is configured to obtain a standard user feature vector corresponding to the target standard user model, and use the standard user feature vector as the feature vector corresponding to the user identifier.

In an embodiment, the matching module 1604A is further configured to: calculate degrees of matching between a user corresponding to the user identifier and the standard user models according to the existing user tags in the user tag set and the corresponding image information, and use a standard user model with a highest degree of matching obtained through calculation as the target standard user model matching the user identifier.

In an embodiment, the matching module 1604A is further configured to: obtain a first standard user model from the standard user models as a current to-be-matched standard user model; obtain image quantities corresponding to the existing user tags in the user tag set; determine current scores corresponding to the existing user tags according to quantity levels to which the image quantities belong; obtain standard scores corresponding to standard user tags that are in the current to-be-matched standard user model and that are the same as the existing user tags; obtain degrees of similarity between the existing user tags in the user tag set and the standard user tags through calculation according to the standard scores and the corresponding current scores; obtain a degree of matching between the user corresponding to the user identifier and the current to-be-matched standard user model according to the degrees of similarity; and obtain a next standard user model as the current to-be-matched standard user model, and repeatedly perform the step of obtaining standard scores corresponding to standard user tags that are in the current to-be-matched standard user model and that are the same as the existing user tags, until the degrees of matching between the user and the standard user models are obtained.

Figure 18:
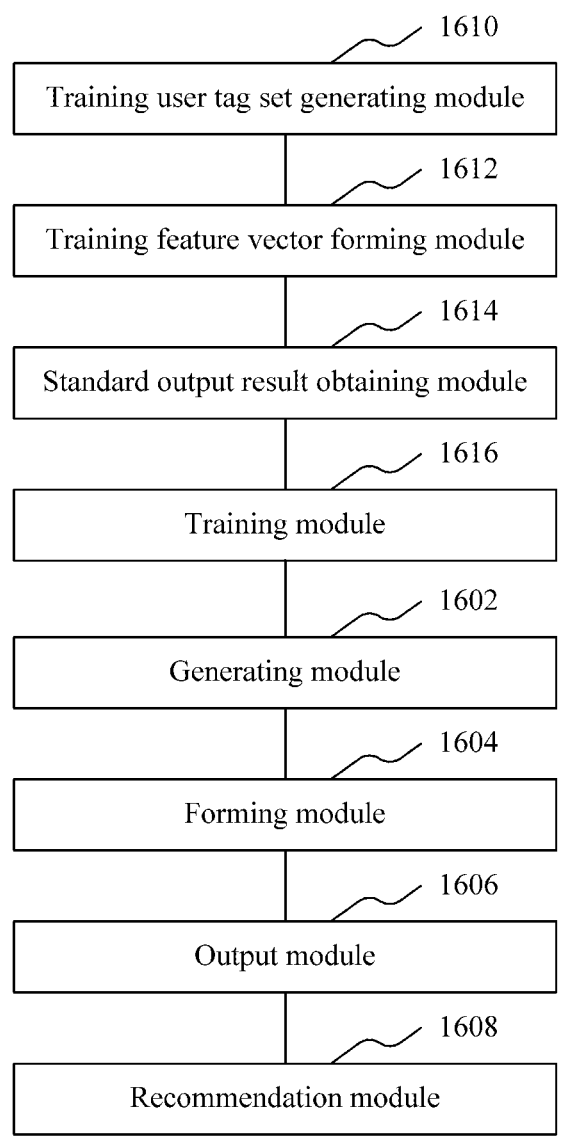
FIG. 18 is a structural block diagram of an information recommendation apparatus in another embodiment.

As shown in FIG. 18, in an embodiment, the information recommendation apparatus further includes a training user tag set generating module 1610, a training feature vector forming module 1612, a standard output result obtaining module 1614, and a training module 1616. The training user tag set generating module 1610 is configured to obtain training image information, and generate a training user tag set according to the training image information. The training feature vector forming module 1612 is configured to form a training feature vector according to training user tags in the training user tag set and the corresponding image information. The standard output result obtaining module 1614 is configured to obtain a standard output result corresponding to the training feature vector. The training module 1616 is configured to perform model training by using the training feature vector and the corresponding standard output result as a training sample, to obtain a target information recommendation model.

In an embodiment, the generating module is further configured to: determine a primary user tag set corresponding to the user identifier according to the image information; extract features of the primary user tag set to generate a corresponding secondary user tag set; and form the user tag set corresponding to the user identifier according to the primary user tag set and the secondary user tag set.

In an embodiment, there are multiple pieces of to-be-recommended information, and each piece of to-be-recommended information has a corresponding information recommendation model; the output module is further configured to: input the feature vector into the trained information recommendation models, and output a corresponding recommendation parameter set, each recommendation parameter in the recommendation parameter set being used for determining a recommendation probability of each piece of to-be-recommended information; generate an information recommendation list corresponding to the user identifier according to the recommendation probability corresponding to each piece of to-be-recommended information; and determine target to-be-recommended information corresponding to the user identifier according to the information recommendation list.

In an embodiment, the recommendation module is further configured to push the to-be-recommended information to the terminal corresponding to the user identifier in a form of a picture if the recommendation parameter is greater than a preset threshold.

Figure 19:
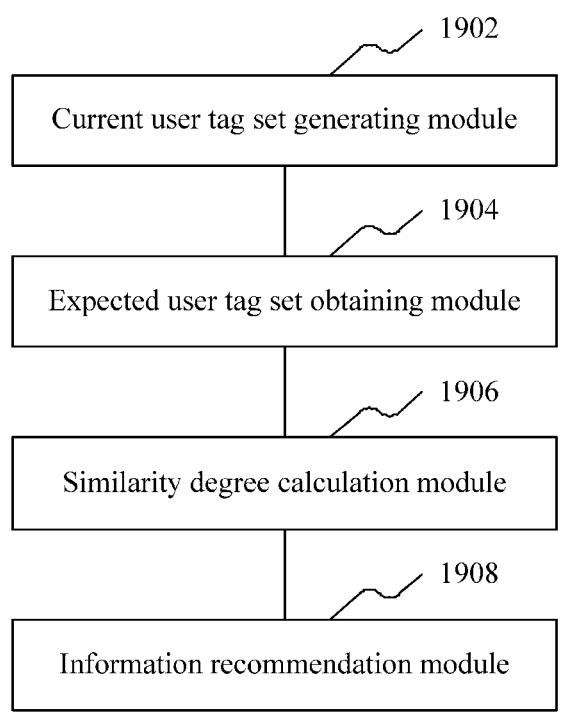
FIG. 19 is a structural block diagram of an information recommendation apparatus in still another embodiment.

As shown in FIG. 19, in an embodiment, an information recommendation apparatus is proposed. The apparatus includes a current user tag set generating module 1902, an expected user tag set obtaining module 1904, a similarity degree calculation module 1906, and an information recommendation module 1908. The current user tag set generating module 1902 is configured to obtain image information, the image information having a corresponding user identifier, and generate a current user tag set corresponding to the user identifier according to the image information. The expected user tag set obtaining module 1904 is configured to obtain to-be-recommended information, and obtain an expected user tag set corresponding to the to-be-recommended information. The similarity degree calculation module 1906 is configured to calculate a degree of similarity between the current user tag set and the expected user tag set. The information recommendation module 1908 is configured to recommend the to-be-recommended information to a terminal corresponding to the user identifier according to the degree of similarity.

In an embodiment, the current user tag set generating module is further configured to: obtain image information, the image information having a corresponding user identifier, generate a primary user tag set corresponding to the user identifier according to the image information, and extract features of the primary user tag set to generate a corresponding secondary user tag set; the similarity degree calculation module is further configured to calculate a degree of similarity between the secondary user tag set and the expected user tag set.

In an embodiment, the similarity degree calculation module is further configured to: obtain image quantities corresponding to current user tags in the current user tag set; determine current scores corresponding to the current user tags according to quantity levels to which the image quantities belong; obtain an expected score corresponding to each user tag in the expected user tag set; and obtain a degree of similarity between the current user tag set and the expected user tag set through calculation according to the current scores and the expected scores.

Figure 20:
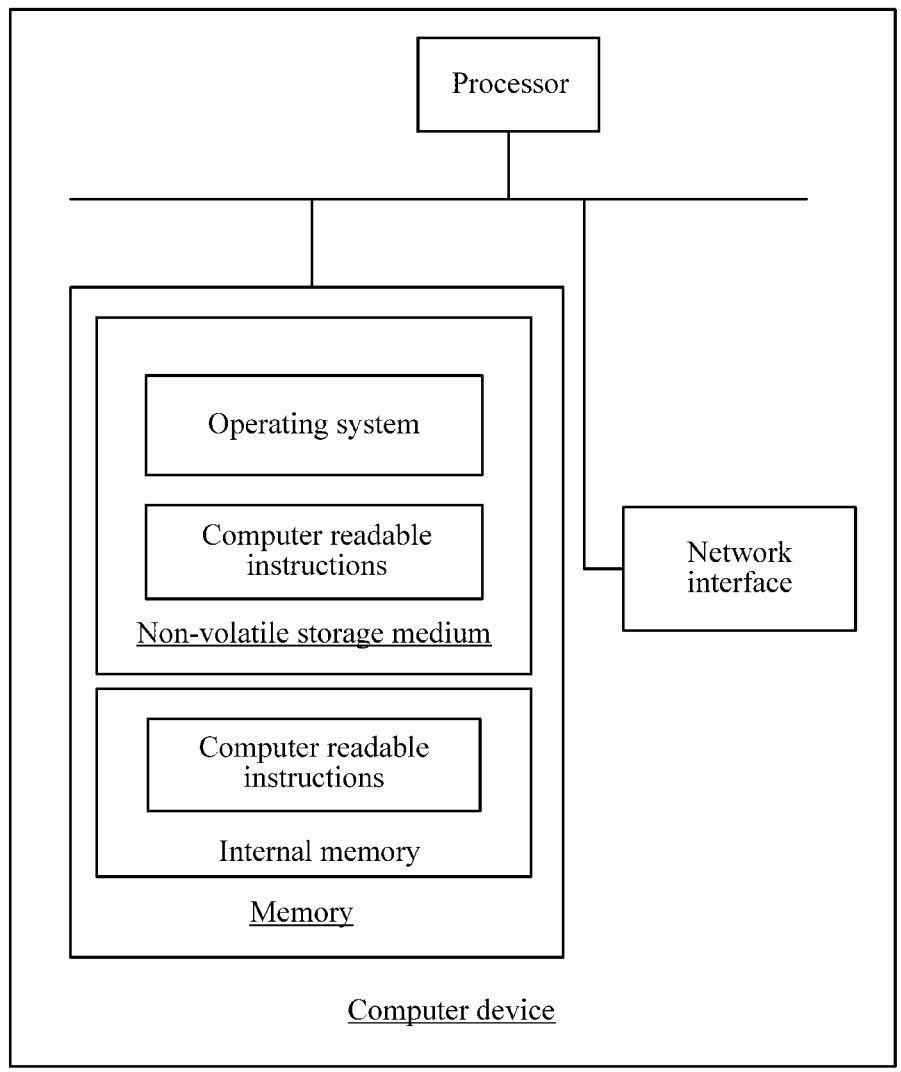
FIG. 20 is a schematic diagram of an internal structure of a computer device in an embodiment.

FIG. 20 is a schematic diagram of an internal structure of a computer device in an embodiment. Referring to FIG. 20, the computer device includes a processor (or processing circuitry), a memory, and a network interface that are connected through a system bus. The memory includes a non-volatile storage medium and an internal memory. The non-volatile storage medium of the computer device may include an operating system and computer readable instructions. When the computer readable instructions are executed, the processor may be enabled to perform an information recommendation method. The processor of the computer device is configured to provide computing and control capabilities, to support running of the whole computer device. The internal memory stores computer readable instructions. When the computer readable instructions are executed by the processor, the processor may be enabled to perform an information recommendation method. The network interface of the computer device is used for network communication. A person skilled in the art may understand that, the structure shown in FIG. 20 is merely a block diagram of a partial structure related to the solution of this application, and but does not limit the computer device to which the solution of this application is applied. A specific computer device may include components more or fewer than those shown in the figure, or some components may be combined, or a different component arrangement may be used.

In an embodiment, a computer device is further provided. An internal structure of the computer device may be as shown in FIG. 20. The computer device includes an information recommendation apparatus. The information recommendation apparatus includes modules, and each module may be completely or partially implemented by software, hardware, or a combination thereof.

In an embodiment, the information recommendation apparatus provided in this application may be implemented in a form of computer readable instructions, which is stored in a non-transitory computer-readable medium for example. The computer readable instructions may be run on the computer device shown in FIG. 20. The non-volatile storage medium of the computer device may store program modules forming the information recommendation apparatus, for example, the obtaining module 1602, the forming module 1604, the output module 1606, and the recommendation module 1608 in FIG. 16. The program modules include computer readable instructions. The computer readable instructions are used for enabling the computer device to perform steps in the information recommendation methods in the embodiments of this application described in this specification. The processor in the computer device can invoke the program modules of the information recommendation apparatus stored in the non-volatile storage medium of the computer device and run the corresponding readable instructions, so as to implement functions corresponding to the modules of the information recommendation apparatus in this specification. The program modules include computer readable instructions. The computer readable instructions are used for enabling the computer device to perform steps in the information recommendation methods in the embodiments of this application described in this specification. The processor in the computer device can invoke the program modules of the information recommendation apparatus stored in the non-volatile storage medium of the computer device and run the corresponding readable instructions, so as to implement functions corresponding to the modules of the information recommendation apparatus in this specification. For example, the computer device may obtain image information through the generating module 1602 in the information recommendation apparatus shown in FIG. 16, the image information having a corresponding user identifier, and generate a user tag set corresponding to the user identifier according to the image information; form, through the forming module 1604, a feature vector corresponding to the user identifier according to user tags in the user tag set and the corresponding image information; process, through the output module 1606, the feature vector according to a trained information recommendation model, to obtain a recommendation parameter of to-be-recommended information; and recommend, through the recommendation module 1608, the to-be-recommended information to a terminal corresponding to the user identifier according to the recommendation parameter.

In an embodiment, the information recommendation apparatus provided in this application may be implemented in a form of computer readable instructions, which is stored in a non-transitory computer-readable medium for example. The computer readable instructions may be run on the shown in FIG. 20. The non-volatile storage medium of the computer device may store program modules forming the information recommendation apparatus, for example, the current user tag set generating module 1902, the expected user tag set obtaining module 1904, the similarity degree calculation module 1906, and the information recommendation module 1908. The program modules include computer readable instructions. The computer readable instructions are used for enabling the computer device to perform steps in the information recommendation methods in the embodiments of this application described in this specification. The processor in the computer device can invoke the program modules of the information recommendation apparatus stored in the non-volatile storage medium of the computer device and run the corresponding readable instructions, so as to implement functions corresponding to the modules of the information recommendation apparatus in this specification. The program modules include computer readable instructions. The computer readable instructions are used for enabling the computer device to perform steps in the information recommendation methods in the embodiments of this application described in this specification. The processor in the computer device can invoke the program modules of the information recommendation apparatus stored in the non-volatile storage medium of the computer device and run the corresponding readable instructions, so as to implement functions corresponding to the modules of the information recommendation apparatus in this specification.

For example, the computer device may obtain image information through the current user tag set generating module 1902 in the information recommendation apparatus shown in FIG. 19, the image information having a corresponding user identifier, and generate a current user tag set corresponding to the user identifier according to the image information; obtain, through the expected user tag set obtaining module 1904, to-be-recommended information, and obtain an expected user tag set corresponding to the to-be-recommended information; calculate, through the similarity degree calculation module 1906, a degree of similarity between the current user tag set and the expected user tag set; and recommend, through the information recommendation module 1908, the to-be-recommended information to a terminal corresponding to the user identifier according to the degree of similarity.

A person of ordinary skill in the art may understand that all or some of the processes in the foregoing method embodiments may be implemented by computer readable instructions instructing relevant hardware. The computer readable instructions may be stored in a non-volatile or non-transitory computer readable storage medium. When the computer readable instructions are executed, the processes of the embodiments of the foregoing methods may be included. In the embodiments of this application, any reference to a memory, storage, a database, or other media may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. As an illustration rather than a limitation, the RAM is available in many forms, for example, a static RAM (SRAM), a dynamic RAM (DRAM), a synchronous DRAM (SDRAM), a double data rate SDRAM (DDRSDRAM), an enhanced SDRAM (ESDRAM), a synchronous link DRAM (SLDRAM), a Rambus Direct RAM (RDRAM), a Direct Rambus Dynamic RAM (DRDRAM).

The foregoing embodiments only represent several implementations of this application, which are specifically described in detail, but cannot be construed as a limitation on the patent scope of this application. For a person of ordinary skill in the art, several modifications and improvements can be made without departing from the conception of this application. All such modifications and improvements belong to the protection scope of this application. Therefore, the patent protection scope of this application is to be subject to the appended claims.

What is claimed is:

1. An information recommendation method, comprising:
    obtaining, by a processing circuitry, image information corresponding to an image, the image is associated with a user identifier;
    generating, by the processing circuitry, a user tag set corresponding to the user identifier and the image information, the user tag set being generated based on a first user tag set and a second user tag set, the second user tag set being generated based on the first user tag set;
    forming, by the processing circuitry, a feature vector corresponding to user tags in the user tag set and the image information;
    processing, by the processing circuitry, the feature vector according to a trained information recommendation model, to obtain a recommendation parameter of to-be-recommended information; and
    providing, by the processing circuitry, a recommendation of the to-be-recommended information to a terminal corresponding to the user identifier according to the recommendation parameter.

2. The method according to claim 1, wherein
    the image information includes image content information and image acquisition information, the image content information including a plurality of images; and
    the generating includes
        classifying, by the processing circuitry, the images according to the image content information, and determining the first user tag set corresponding to the image content information based on a result of the classification according to the image content information; and
        classifying, by the processing circuitry, the images according to the image acquisition information, and determining the second user tag set corresponding to the image acquisition information based on a result of the classification according to the image acquisition information.

3. The method according to claim 1, wherein the forming comprises:
    performing, by the processing circuitry, matching with standard user models according to the user tags in the user tag set and the image information corresponding to the user tags when a scale of the user tag set corresponding to the user identifier is less than a preset scale;
    determining, by the processing circuitry, a target standard user model of the standard user models matching the user identifier; and
    obtaining, by the processing circuitry, a standard user feature vector corresponding to the target standard user model as the feature vector corresponding to the user identifier.

4. The method according to claim 3, wherein the performing comprises:
    calculating, by the processing circuitry, degrees of matching between a user corresponding to the user identifier and the standard user models according to the user tags in the user tag set and the image information corresponding to the user tags; and
    selecting, by the processing circuitry, a standard user model of the standard user models with a highest degree of matching of the calculated degrees of matching as the target standard user model matching the user identifier.

5. The method according to claim 4, wherein the calculating comprises:
    obtaining, by the processing circuitry, image quantities corresponding to the user tags in the user tag set;
    determining, by the processing circuitry, current scores corresponding to the user tags according to the image quantities;
    for each of the standard user models,
        obtaining, by the processing circuitry, standard scores corresponding to standard user tags that are in the respective standard user model and that are the same as the user tags,
        calculating, by the processing circuitry, degrees of similarity between the user tags in the user tag set and the standard user tags according to the standard scores and the corresponding current scores, and
        obtaining, by the processing circuitry, the degree of matching between the user corresponding to the user identifier and the respective standard user model according to the degrees of similarity.

6. The method according to claim 1, further comprising:
    obtaining, by the processing circuitry, training image information;
    generating, by the processing circuitry, a training user tag set according to the training image information;
    forming, by the processing circuitry, a training feature vector according to training user tags in the training user tag set and the training image information corresponding to the training user tag set;
    obtaining, by the processing circuitry, a standard output result corresponding to the training feature vector; and
    performing, by the processing circuitry, model training by using the training feature vector and the standard output result as a training sample, to obtain a target information recommendation model.

7. The method according to claim 1, wherein the generating comprises:
    determining, by the processing circuitry, the first user tag set corresponding to the user identifier and the image information;
    generating, by the processing circuitry, the second user tag set based on extracted features of the first user tag set; and
    forming, by the processing circuitry, the user tag set corresponding to the user identifier according to the first user tag set and the second user tag set.

8. The method according to claim 1, wherein
each piece of the to-be-recommended information has a corresponding information recommendation model; and
the processing includes
- processing, by the processing circuitry, the feature vector according to the corresponding information recommendation models, to obtain a corresponding recommendation parameter set, each recommendation parameter in the recommendation parameter set being used for determining a recommendation probability of one piece of the to-be-recommended information,
- generating, by the processing circuitry, an information recommendation list corresponding to the user identifier according to the recommendation probabilities corresponding to the pieces of the to-be-recommended information, and
- determining, by the processing circuitry, target to-be-recommended information corresponding to the user identifier according to the information recommendation list.

9. The method according to claim 1, wherein the providing comprises:
providing, by the processing circuitry, the to-be-recommended information to the terminal corresponding to the user identifier in a form of a picture when the recommendation parameter is greater than a preset threshold.

10. An information recommendation method, comprising:
obtaining, by processing circuitry, image information, the image information corresponding to an image, the image is associated with a user identifier;
generating, by the processing circuitry, a current user tag set corresponding to the user identifier and the image information, the user tag set being generated based on a first user tag set and a second user tag set, the second user tag set being generated based on the first user tag set;
obtaining, by the processing circuitry, to-be-recommended information;
obtaining, by the processing circuitry, an expected user tag set corresponding to the to-be-recommended information;
calculating, by the processing circuitry, a degree of similarity between the current user tag set and the expected user tag set; and
providing, by the processing circuitry, a recommendation of the to-be-recommended information to a terminal corresponding to the user identifier according to the degree of similarity.

11. The method according to claim 10, wherein
the generating includes
- generating, by the processing circuitry, the first user tag set corresponding to the user identifier and the image information,
- generating, by the processing circuitry, the second user tag set based on extracted features of the first user tag set, and
- generating the current user tag set based on the first user tag set and the second user tag set; and
the calculating includes calculating, by the processing circuitry, the degree of similarity between the second user tag set and the expected user tag set.

12. The method according to claim 10, wherein the calculating comprises:
- obtaining, by the processing circuitry, image quantities corresponding to current user tags in the current user tag set;
- determining, by the processing circuitry, current scores corresponding to the current user tags according to the image quantities;
- obtaining, by the processing circuitry, an expected score corresponding to each user tag in the expected user tag set; and
- calculating, by the processing circuitry, the degree of similarity between the current user tag set and the expected user tag set according to the current scores and the expected scores.

13. An information processing apparatus, comprising:
processing circuitry configured to
- obtain image information corresponding to an image, the image is associated with a user identifier;
- generating a user tag set corresponding to the user identifier and the image information, the user tag set being generated based on a first user tag set and a second user tag set, the second user tag set being generated based on the first user tag set;
- forming a feature vector corresponding to user tags in the user tag set and the image information;
- processing the feature vector according to a trained information recommendation model, to obtain a recommendation parameter of to-be-recommended information; and
- providing a recommendation of the to-be-recommended information to a terminal corresponding to the user identifier according to the recommendation parameter.

14. The information processing apparatus according to claim 13, wherein
the image information includes image content information and image acquisition information, the image content information including a plurality of images; and
the processing circuitry is configured to
- classify the images according to the image content information, and determine the first user tag set corresponding to the image content information based on a result of the classification according to the image content information; and
- classify the images according to the image acquisition information, and determine the second user tag set corresponding to the image acquisition information based on a result of the classification according to the image acquisition information.

15. The information processing apparatus according to claim 13, wherein the processing circuitry is configured to
perform matching with standard user models according to the user tags in the user tag set and the image information corresponding to the user tags when a scale of the user tag set corresponding to the user identifier is less than a preset scale;
determine a target standard user model of the standard user models matching the user identifier; and
obtain a standard user feature vector corresponding to the target standard user model as the feature vector corresponding to the user identifier.

16. The information processing apparatus according to claim 15, wherein the processing circuitry is configured to
calculate degrees of matching between a user corresponding to the user identifier and the standard user models according to the user tags in the user tag set and the image information corresponding to the user tags; and select a standard user model of the standard user models with a highest degree of matching of the calculated degrees of matching as the target standard user model matching the user identifier.

17. The information processing apparatus according to claim 16, wherein the processing circuitry is configured to
obtain image quantities corresponding to the user tags in the user tag set;
determine current scores corresponding to the user tags according to the image quantities; and
for each of the standard user models,
obtain standard scores corresponding to standard user tags that are in the respective standard user model and that are the same as the user tags,
calculate degrees of similarity between the user tags in the user tag set and the standard user tags according to the standard scores and the corresponding current scores, and
obtain the degree of matching between the user corresponding to the user identifier and the respective standard user model according to the degrees of similarity.

18. The information processing apparatus according to claim 13, wherein the processing circuitry is configured to
obtain training image information;
generate a training user tag set according to the training image information;
form a training feature vector according to training user tags in the training user tag set and the training image information corresponding to the training user tag set;
obtain a standard output result corresponding to the training feature vector; and
perform model training by using the training feature vector and the standard output result as a training sample, to obtain a target information recommendation model.

19. The information processing apparatus according to claim 13, wherein the processing circuitry is configured to
determine the first user tag set corresponding to the user identifier and the image information;
extract features of the first user tag set to generate the corresponding second user tag set; and
form the user tag set corresponding to the user identifier according to the first user tag set and the second user tag set.

20. An information processing apparatus, comprising:
processing circuitry configured to
obtain image information, the image information corresponding to an image, the image is associated with a user identifier;
generate a current user tag set corresponding to the user identifier and the image information, the user tag set being generated based on a first user tag set and a second user tag set, the second user tag set being generated based on the first user tag set;
obtain to-be-recommended information;
obtain an expected user tag set corresponding to the to-be-recommended information;
calculate a degree of similarity between the current user tag set and the expected user tag set; and
provide a recommendation of the to-be-recommended information to a terminal corresponding to the user identifier according to the degree of similarity.

* * * * *